United States Patent [19]

Barber

[11] Patent Number: 4,919,906
[45] Date of Patent: Apr. 24, 1990

[54] PROCESSES AND EQUIPMENT FOR PRODUCTION OF ELEMENTAL PHOSPHORUS AND THERMAL PHOSPHORIC ACID

[75] Inventor: James C. Barber, Florence, Ala.

[73] Assignee: James C. Barber and Associates, Inc., Florence, Ala.

[21] Appl. No.: 201,747

[22] Filed: Jun. 3, 1988

[51] Int. Cl.$^5$ ............................................. C01B 25/01
[52] U.S. Cl. ........................................ 423/323; 71/34;
422/140; 422/189; 422/225; 423/167; 423/310;
423/313; 423/317; 423/470; 423/471; 423/490
[58] Field of Search ................ 423/317, 323, 167, 310,
423/313, 470, 471, 490

[56] References Cited

U.S. PATENT DOCUMENTS

| 4,372,929 | 2/1983 | Barber | 423/323 |
|---|---|---|---|
| 4,537,615 | 8/1985 | Barber | 423/167 |
| 4,623,528 | 11/1986 | Barber | 423/167 |
| 4,649,035 | 3/1987 | Barber | 423/317 |

*Primary Examiner*—John Doll
*Assistant Examiner*—Wayne A. Langel
*Attorney, Agent, or Firm*—James J. Brown

[57] ABSTRACT

New processes and equipment are disclosed for producing elemental phosphorus and thermal phosphoric acid. Benefits are listed below.

1. Phosphorus-containing solids are recycled to smelting furnaces thus eliminating hazardous waste generation.
2. Phosphorus furnace feedstock is upgraded and this permits unbeneficiated phosphate ore to be smelted.
3. Energy is conserved during manufacture of elemental phosphorus and phosphoric acid.
4. Electric energy is produced by cogeneration.
5. Fluorine in phosphate ore is recovered as ammonium fluoride.
6. Phosphorus-containing liquids are used as feedstock for production of suspension fertilizers.

Benefits are achieved by agglomerating phosphate ore with monocalcium phosphate binder by a method which upgrades the ore. Phosphorus-containing solids are fluidized and burned to form an impure phosphoric acid mixture which is reacted with small sized phosphate ore to form monocalcium phosphate binder. Gases from agglomerator are scrubbed with condenser water to collect fluorine compounds. Scrubber effluent is treated with ammonia to convert fluosilicate compounds to ammonium fluoride and precipitate silica. Precipitate is added to agglomerator to provide $SiO_2$ as flux to smelt phosphate ore. Surplus condenser water, containing ammonium fluoride and ammonium phosphate, is used to produce suspension fertilizers. Elemental phosphorus is burned to form $P_2O_5$ which is hydrated with water to make phosphoric acid. Energy released by burning elemental phosphorus and by hydrating $P_2O_5$ is recovered as electric energy. Byproduct furnace gas is cleaned and burned in a cogeneration facility to produce electric energy.

34 Claims, 4 Drawing Sheets

PROCESSES AND EQUIPMENT FOR PRODUCTION OF ELEMENTAL PHOSPHORUS AND THERMAL PHOSPHORIC ACID

BACKGROUND OF THE INVENTION

Method of Producing Elemental Phosphorus and Thermal Phosphoric Acid

Elemental phosphorus is produced commercially by smelting a mixture of phosphate ore, reducing carbon, and silica rock in submerged-arc electric furnaces. Metallurgical coke is commonly used as reducing carbon but various other forms of carbon can be used. In the furnace, carbon combines with oxygen in phosphate ore to form carbon monoxide, and phosphorus is released as the element. Also, carbon combines with water to form both carbon monoxide and hydrogen by the following chemical reaction.

$$C + H_2O = CO + H_2.$$

Feedstock is normally dried, but some moisture remains after drying and this provides water for reduction reaction shown above. Feedstock may contain combined water which will not be removed by drying. Combined water is reduced to form carbon monoxide and hydrogen.

Silica rock supplies $SiO_2$ which combines with CaO and $Al_2O_3$ in phosphate ore to form calcium silicate and aluminum silicate. Mixture of silicates is removed from the furnace as a molten material by tapping. Mixture is called slag, and various metals which are found in phosphate ore are incorporated in slag as an insoluble and innocuous mass. Sometimes low-grade phosphate ores are smelted which contain enough $SiO_2$ to combine with CaO and $Al_2O_3$ and in this case no silica rock is used in the feed mixtures.

Gases discharging from furnaces are a mixture of carbon monoxide, hydrogen, and elemental phosphorus. The mixture is called furnace gases. Elemental phosphorus is separated from gas mixture by cooling the furnace gas by contacting it with water. Elemental phosphorus condenses as a liquid; however, a phosphorus-containing solid is obtained which is called phosphorus sludge. Although phosphorus sludge is normally treated to recover elemental phosphorus, recovery of the element is incomplete and a phosphorus-containing solid is obtained. Since elemental phosphorus is a toxic chemical, phosphorus-containing solids are hazardous substances.

At some plants, dust is removed from furnace gases before they are cooled with water. Electrostatic precipitators may be installed to remove dust, and these devices are upstream from the phosphorus condenser. A small amount of elemental phosphorus adsorbs on the dust particles and collected dust is a phosphorus-containing solid. However, electrostatic precipitators decrease the quantity of phosphorus sludge made.

When furnace gases are contacted with water they are cooled adiabatically. Particles of inorganic solids, including particles of elemental phosphorus, become suspended in the water. A process was developed to remove suspended solids from the condenser water and thereby permit the water to be reused as a cooling medium. In the process, suspended solids were separated from liquid phase by clarifying condenser water as described in a publication, "Waste Effluent; Treatment and Reuse," J. C. Barber, *Chemical Engineering Progress*, volume 65, No. 6, June 1969. Overflow from clarifier was reused for cooling furnace gases and underflow was a phosphorus-containing solid. Clarifier underflow is another hazardous waste generated when elemental phosphorus is produced.

Dissolved solids accumulate in condenser water but these solids are not removed by clarification. Dissolved solids may be fluorine compounds and ammonium phosphates and they will continue to accumulate in recycled condenser water until the water becomes ineffective as a cooling medium. Some of the fluorine compounds are present as fluosilicate salts which may precipitate as tenacious scales in the condensing equipment. Therefore, a stream of clarified condenser water is bled off and replaced with water containing small concentrations of dissolved solids. Rate of bleedoff is usually determined by buildup of fluorine compounds. Condenser water contains elemental phosphorus in forms which are not removed by clarification; consequently, bleedoff is a phosphorus-containing liquid frequently called "phossy water." It is toxic waste because it contains phosphorus in its elemental form.

Hazardous wastes generate during production of elemental phosphorus are as follows.
Precipitator dust
Phosphorus sludge
Clarifier underflow
Phossy water About 80 percent of the phosphorus produced in the United States is converted into a product called thermal phosphoric acid. In the conversion, phosphorus is burned with air to form $P_2O_5$ and this oxide then combines with water to form phosphoric acid.

Much energy in the form of electric energy and reducing carbon is required to smelt phosphate ores. However, much of the energy is released when elemental phosphorus is converted into phosphoric acid. Heat is released when elemental phosphorus is burned to form $P_2O_5$, and additional heat is released when $P_2O_5$ reacts with water to form phosphoric acid. Heretofore, energy from conversion of elemental phosphorus into phosphoric acid has been wasted, but processes are needed to convert wasted heat into electric energy.

the phosphorus industry has been severely handicapped because of the following problems.

1. Rigid enforcement of environmental regulations threatens the industry because of cost of environmental controls.

2. Electric energy costs have skyrocketed and this has caused large increases in cost of producing elemental phosphorus.

There has been little incentive for development of new products from either elemental phosphorus or thermal phosphoric acid.

A program was undertaken to provide relief from the two problems cited above. Processes were developed to reuse phosphorus-containing solids and to recover phossy water in suspension fertilizers. Energy is recovered in the form of electric energy. Disclosures presented herewith illustrate processes and equipment for correcting the hazardous waste problem and for conserving electric energy.

Objects of the Invention

Major objectives are given below.

1. Primary object is to recycle phosphorus-containing solids by a process which will utilize elemental phosphorus and phosphorus compounds. In 1987 the U.S. Court of Appeals determined that materials reused in an ongoing manufacturing process cannot be regulated by the Environmental Protection Agency (EPA) under the Resource Conservation and Recovery Act Amendments of 1984 (RCRA). EPA proposes to exclude from regulation certain in-process recycled secondary materials in the petroleum refining industry, and certain other sludges, byproducts, and spent materials that are reclaimed as part of continuous, on-going manufacturing processes. Refer to *Chemical Engineering Progress* for March 1988, page 15, for more detailed discussion of exemptions under RCRA regulations. Therefore, overall objective is to provide processes which exempt phosphorus-containing solids from RCRA rules.

2. Another object of the invention is to use phossy water as feedstock for the production of suspension fertilizer. Phossy water will become a byproduct instead of a hazardous waste. The overall objective, therefore, is to exempt this phosphorus-containing liquid from RCRA regulations.

3. Another object is to recycle phosphorus-containing solids by processes which will upgrade feedstock and thereby permit unbeneficiated phosphate ore to be smelted. Energy is conserved by smelting upgraded material. Also, mineral resources are conserved because phosphorus values are lost when ore is upgraded by beneficiation.

4. A further object is to conserve electric energy by cogeneration. Byproducts furnace gas can be cleaned and burned in a facility to generate electric energy. A solution to the problem of high electric energy costs is sought by use of byproduct furnace gas as fuel for generation of electric energy.

5. Another object is to recover fluorine as ammonium fluoride. The chemical has benefits in making suspension fertilizers. Gel formation is prevented and quality of suspension fertilizers is thereby improved.

6. A final object of the invention is to conserve energy during conversion of elemental phosphorus to phosphoric acid. It is an object to convert heat released from combustion of elemental phosphorus and from hydration of $P_2O_5$ to electric energy. Part of electric energy consumed in smelting phosphate ore is thereby recovered.

DISCLOSURES IN THE INVENTION

The following four U.S. patents are precursors to the present patent application.

U.S. Pat. No. 4,608,241, "Production of Phosphorus and Phosphoric Acid," issued Aug. 26, 1986.
U.S. Pat. No. 4,649,035, "Production of Phosphorus and Phosphoric Acid," issued Mar. 10, 1987.
U.S. Pat. No. 4,656,020, "Production of Phosphorus and Phosphoric Acid," issued Apr. 7, 1987.
U.S. Pat. No. 4,670,240, "Energy Conservation During the Smelting of Ores," issued June 2, 1987.

Processes disclosed in the patents cited above permit phosphorus-containing liquids to be recovered, they permit phosphorus-containing solids to be recycled, and electric energy is conserved. Development of the inventions has led to improvements which are discussed below.

1. A process was disclosed in U.S. Pat. No. 4,649,035 for burning phosphorus sludge. A mixture of phosphorus acids was made, but most of the acid is phosphoric ($H_3PO_4$). This acid mixture was used to prepare a binder to agglomerate phosphorus furnace feedstock. Agglomerates can be hardened at relatively low temperatures. FIG. 3 in U.S. Pat. No. 4,608,241 is a diagram which discloses preparation of an impure phosphoric acid mixture, and the diagram discloses a method for recycling impure phosphoric acid mixture to agglomerator wherein phosphate ore is agglomerated. A further development has led to an improvement whereby all the phosphorus-containing solids—phosphorus sludge, precipitator dust, and clarifier underflow—are recycled. The three materials are mixed in preparation for burning in a phosphoric acid production unit. Since elemental phorphorus content of the fluidized mixture is inadequate to support combustion, an air heater shown in FIG. 2 in U.S. Pat. No. 4,608,241 can be used to add heat and promote combustion. Process is further improved by fluidizing a mixture of phosphorus sludge, precipitator dust, clarifier underflow, and elemental phosphorus. Elemental phosphorus is added to enrich mixture and promote combustion. After fluidization, mixture is burned to make mixture of phosphorus acids as described in the precursor patents.

2 Apparatus shown in FIG. 1 is disclosed for fluidizing phosphorus-containing solids.

3. Process disclosed in U.S. Pat. No. 4,649,035 was improved to recover energy resulting from combustion of fluidized mixture of phosphorus-containing solids. Claim 22 in U.S. Pat. No. 4,670,240 discloses a process for production of elemental phosphorus and cogeneration of electric energy. And in dependent claim 36, cleaned furnace gas is burned in a boiler to generate steam, and said steam drives a turbine to generate electric energy. Energy is released when phosphorus-containing solids are burned to form phosphorus oxides, and additional energy is released when phosphorus oxides are hydrated to acids. It is already known in the art that phosphoric acid can be cooled and recycled to the production unit as a cooling medium. Cooled acid is sprayed into the combustion chamber, hydrator, and venturi scrubber to control process temperature and prevent excessive corrosion. Heretofore, energy resulting from combustion of phosphorus and hydration of $P_2O_5$ has been wasted because cooling water was discarded as an effluent. However, boiler feedwater can be used instead of process water and energy will be recovered. Steam produced in the boiler can be used in a steam turbine to generate electric energy. Energy from combustion of phosphorus-containing solids, from hydration of phosphorus oxides, and from preheating combustion air is thereby converted into electric energy. Energy resulting from combustion of elemental phosphorus and from hydration of $P_2O_5$ to form phosphoric acid is converted into electric energy by a similar process.

4. FIG. 2 is a cooling assembly wherein phosphoric acid is cooled with boiler feedwater as the cooling medium.

5. A refinement was made in method for agglomeration of furnace feedstock. In U.S. Pat. Nos. 4,649,035 and 4,650,020, phosphate ore is agglomerated by tumbling with a binder formed by reacting acidic phosphorus compounds with alkaline substances. Claim 1 in U.S. Pat. No. 4,670,240 discloses a method for agglomerating a mixture of phosphate ore and silica rock. Mixture of phosphate ore and stilica rock is used as feedstock. Reducing carbon can be agglomerated by a similar method. Claim 5 in U.S. Pat. No. 4,670,240 identifies binder used in agglomeration processes to be monocalcium phosphate monohydrate formed by combining phosphoric acid and finely divided phosphate ore. Concentrated superphosphate has been produced commercially by mixing thermal phosphoric acid and finely divided phosphate ore in a cone-shaped mixer. Thermal phosphoric acid is made from elemental phosphorus and the process is described in the publication, "Development of Processes for Production of Concentrated Superphosphate," Chemical Engineering Report No. 5, Tennessee Valley Authority, 1949. FIG. 60 in the publication is a sketch of mixer. A cone-shaped reactor similar to mixer to concentrated superphosphate process is used to prepare binder for agglomeration of feedstock.

6. Fluorine volatilizes when phosphate ores are heated to high temperatures. It is current practice to agglomerate phosphate ores by processes which require heating to temperatures high enough to volatilize a portion of the fluorine. Since fluorine is an air pollutant, exhaust gases must be treated to prevent emission of fluorine in air. Exhaust gases are normally scrubbed with water to absorb fluorine, much of which is present as the compound $SiF_4$. The $SiF_4$ reacts with water as shown below.

$$3SiF_4 + 2H_2O = 2H_2SiF_6 + SiO_2.$$

Fluosilicic acid ($H_2SiF_6$) solution is formed and silica ($SiO_2$) is precipitated. Phosphate ores contain small percentages of sodium and potassium compounds and the metals react with fluosilicic acid to form sodium and potassium fluosilicates ($Na_2SiF_6$ and $K_2SiF_6$). The salts are slightly soluble in water and they precipitate as tenacious scales by processes similar to boiler scale. Packed scrubbers are not applicable for removing fluorine from exhaust gases because sodium and potassium fluosilicates precipitate in the packing. Spray towers are used instead of packed towers, but effectiveness of fluorine removal is sacrificed with spray towers. Fluorine is emitted as particulates from the spray towers. Entrainment collectors are impractical because fluosilicate scales are deposited. A disclosure of the present invention is to provide an agglomeration process which does not involve heating phosphate ore to high temperatures. The temperatures are limited to about 1200° F. and fluorine is not volatilized.

7. Item 5 above describes a process for making concentrated superphosphate whereby thermal phosphoric acid is reacted with ground phosphate to make concentrated superphosphate. A further disclosure is to use a cone reactor similar to cone mixer used in concentrated superphosphate process. After mixing, the fertilizer is normally stored in large piles under ambient conditions for 2-3 months to allow reactions to proceed to completion. However, reactions may be driven to completion by heating mixture in a dryer according to "quick-curing" process. Chapter VI in "Development of Processes for Production of Concentrated Superphosphate," Chemical Engineering Report No. 5, Tennessee Valley Authority, 1949, describes this process for making the fertilizer. In the present disclosure, kinetics are improved by heating as in the quick-curing process. Water of hydration in monocalcium phosphate monohydrate is volatilized during hardening of agglomerates.

8. Fluorine is volatilized when mixture of phosphoric acid and ground phosphate is heated. For example, data in FIG. 72 in "Development of Processes for Production of Concentrated Superphosphate," Chemical Engineering Report No. 5, Tennessee Valley Authority, 1949, shows that about 50 percent of fluorine in phosphate ore is volatilized by heating to 392° F. The $P_2O_5$:-CaO mole ratio in the mixture was in the range 0.93 to 0.95 and the heating time varied from 15 to 120 minutes. Fluorine volatilized during the reaction is readily recovered by absorption in water, thus providing a method whereby a substantial amount of fluorine in phosphate ore is recovered during production of elemental phosphorus.

9. A further process is disclosed whereby exhaust gases from dryer 37 in FIG. 3 are scrubbed with condenser water in which ammonia has been added to increase the pH to 8.5, or above. The following reaction occurs.

$$H_2SiF_6 + 6HN_3 + 2H_2O = 6HN_4F + SiO_2.$$

Fluosilicic acid is converted to ammonium fluoride in the process and formation of fluosilicate scale is prevented.

10. In disclosure 9, vapor pressure of ammonia over ammoniacal solution having a pH of 8.5 or higher will result in significant ammonia losses in scrubber exhaust gases. In order to prevent such losses, gases are scrubbed with condenser water having pH in the range of 5.5 to 6.0. Ammonia vapor pressure is low enough to avoid ammonia losses, and overall efficiency of fluorine recovery is improved.

11. When fluosilicic acid is converted to ammonium fluoride as discussed in item 9, silica is precipitated as a hydrous solid. This precipitated material has properties which make it useful as a binder for agglomeration. Furthermore, silica is a flux which combines with CaO and $Al_2O_3$ to form slag during smelting of phosphate ores. Silica precipitated in items 6 and 9 is separated from the liquid phase and it is added to phosphate ore 33 in FIG. 3. In accordance with this disclosure, hydrous silica serves dual function of binder and flux.

12. A further disclosure is a process for producing suspension fertilizers by using condenser water as feedstock. A stream or recirculating condenser water is bled off, clarified, and returned to the condensing system. Clarified condenser water contains dissolved ammonium phosphate and ammonium fluoride. A stream of clarified water is bled off and used as feedstock for making fertilizer. Solid diammonium phosphate fertilizer is dissolved in solution and a suspending clay is added to prevent crystallized ammonium phosphate from settling. Suspension fertilizers are thereby made as a byproduct.

13. When suspension fertilizers are made, strong gels may be formed because of impurities present in ammonium phosphate fertilizers. When gels are present the mixture may solidify upon storage. Allowable storage time is shortened with such mixtures. Phosphorus may be combined as complex metal compounds which are insoluble, and nutrient value of the material is lost. But ammonium fluoride prevents gels from forming and phosphorus does not combine with metals as insoluble compounds. Since clarified condenser water in item 12 contains ammonium fluoride, a process is described for making high-quality suspension fertilizer.

14. A process is disclosed for recycling phosphorus-containing solids. Claim 1 in U.S. Pat. No. 4,608,241 discloses a process for distilling phosphorus-containing solids to recover elemental phosphorus. Still residue can be agglomerated by use of monocalcium phosphate binder in accordance with process illustrated in FIG. 3. Hardened agglomerates are used as feedstock for production of elemental phosphorus. Phosphorus-containing solids containing 0.0 to 0.5 percent elemental phosphorus can be agglomerated and used as feedstock without distilling. In this case, agglomerates are distilled inside smelting furnace and elemental phosphorus is recovered in condensing system.

Figures 1, 1A, 1B:
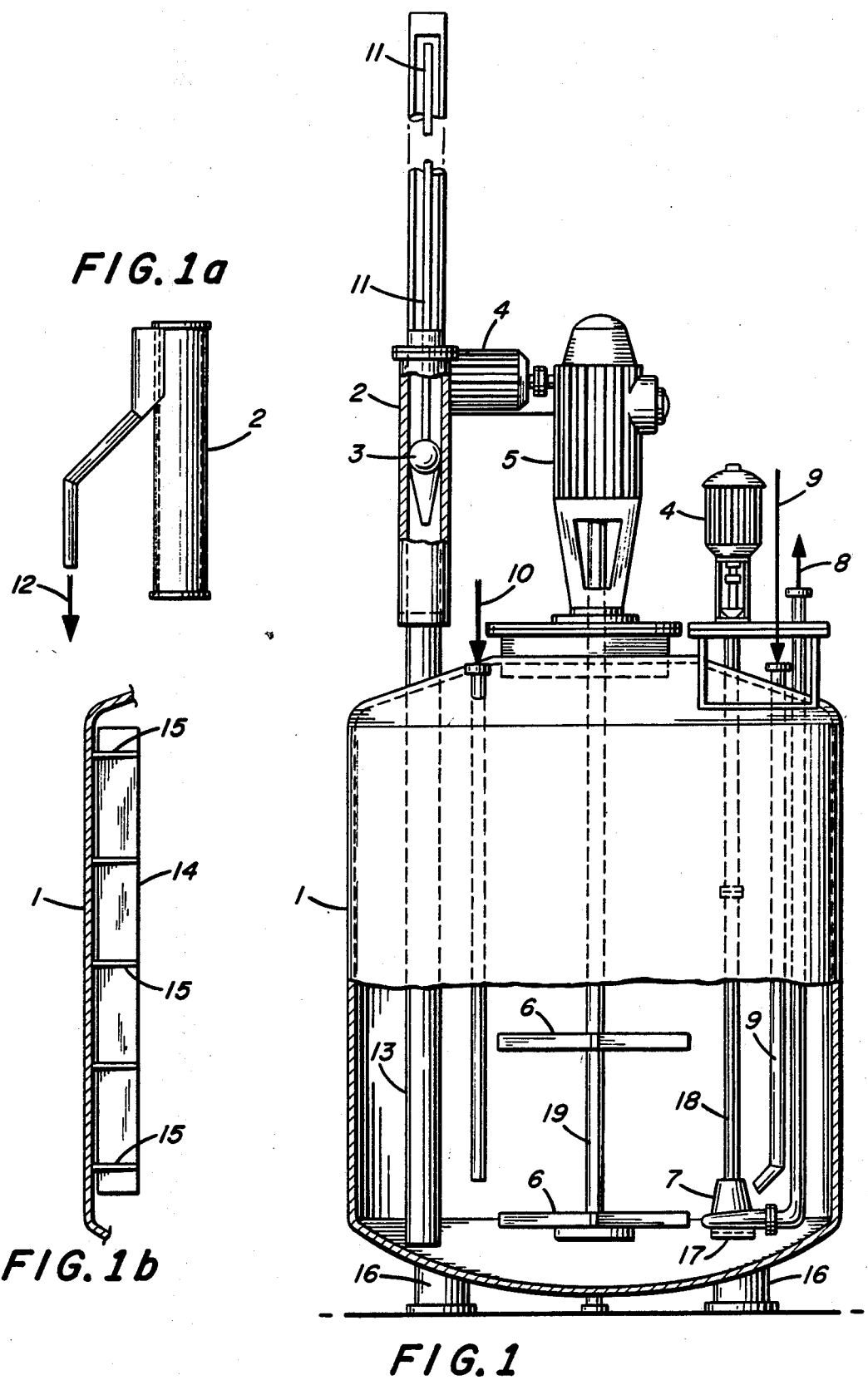
FIG. 1 is a drawing of an assembly to fluidize a mixture of phosphorus-containing solids wherein solids are mixed in tank designated 1 and it supported on legs 16. Phosphorus-containing solids are added by means of pipe 9. These materials are discharged from pipe 9 in vicinity of pump 7 which is powered by electric motor 4. Fluidization is achieved by recycling wherein phosphorus-containing solids are pumped through pipe 8 by means of piping not shown in FIG. 1. Materials are returned to tank 1 by pipe 10. Strainer 17 prevents large particles from being recycled. A stream of fluidized solids is bled off from the recycled material by means of piping not shown FIG. 1, and bled material is burned in combustion chamber.

Solids in tank 1 are further fluidized by agitator blades 6. Agitator is powered through gear train 5 and motor 4. Four baffles designated 14 are equally spaced in tank 1 to aid in fluidizing phosphorus-containing solids. Baffles 14 are attached to tank 1 by supports 15, as shown in FIG. 16.

Tank 1 is kept full of phosphorus-containing solids to avoid a gas space in tank. Dispersants can be added through pipe 10. Standpipe 2 is provided to maintain tank full of phosphorus-containing solids. Overflow drains to sump as indicated by 12 in FIG. 1a, and material in sump is returned to tank 1. A ball float 3 is provided; 11 is float rod, and 13 is float tube.

Figure 2:
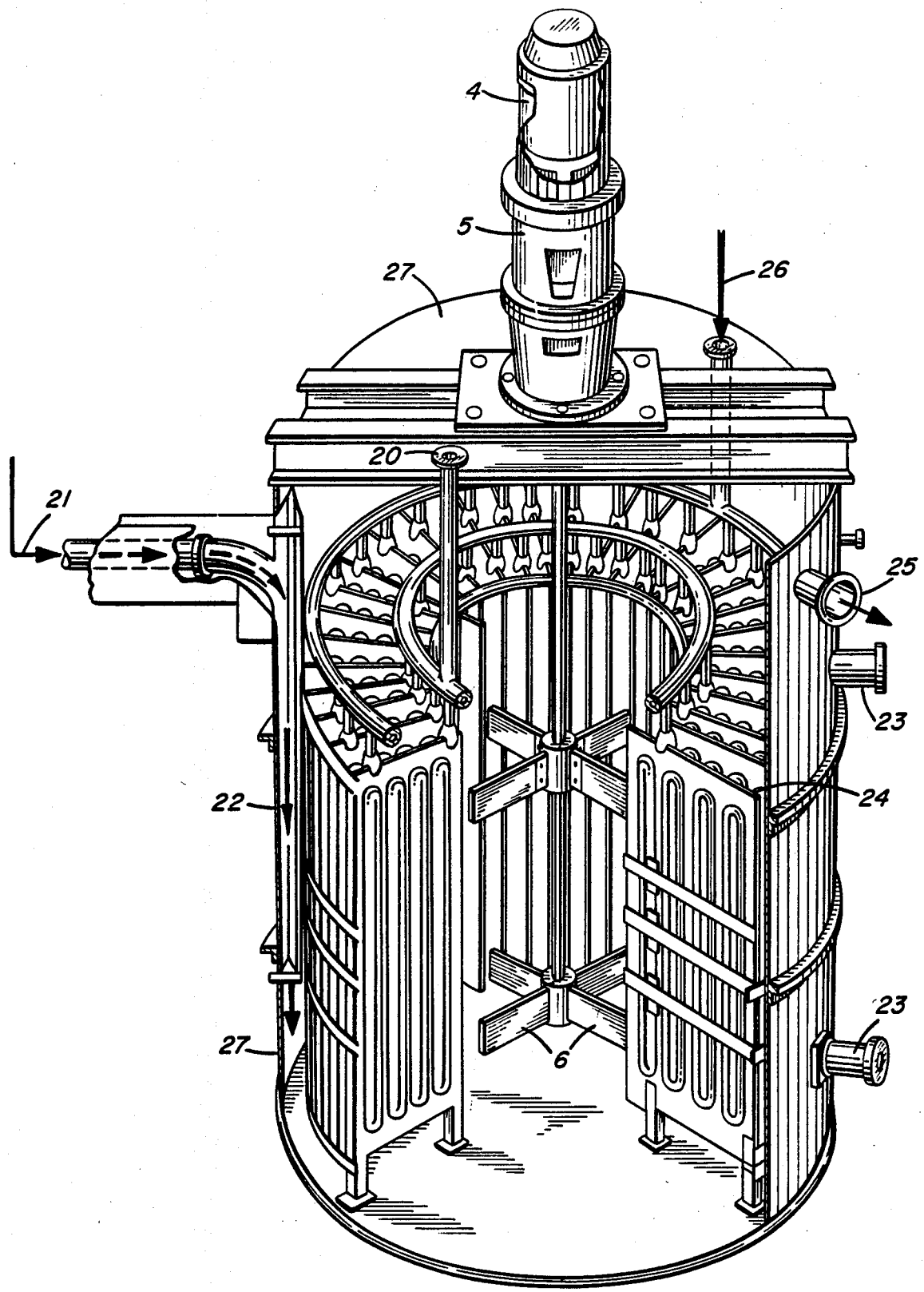

FIG. 2 is phosphoric acid cooler assembly. Hot phosphoric acid solution 21 flows through internal seal leg 22 and acid submerges Platecoil cooler units 24. Cooler tank 27 has two outlets 23 for recycling cooled phosphoric acid solution to production unit. Outlet 25 is for cooled product acid which is pumped to storage.

Boiler feedwater enters cooler tank 27 at 26 and flows through Platecoil cooler units 24. Pipe connections between header and Platecoil cooler units are not shown. Heat is transferred from hot phosphoric acid solution 21 to boiler feedwater 26. However, connection between Platecoil cooler units and header for heated boiler feedwater are not shown in FIG. 2. Heated boiler feedwater exits the phosphoric acid cooler assembly through pipe 20. Heated boiler feedwater is pumped to a boiler not shown in FIG. 2.

Hot phosphoric acid solution 21 is agitated in cooler tank 27 by agitator blades 6. Agitator is powered by motor 4 which operates through gear train 5.

Figure 3:
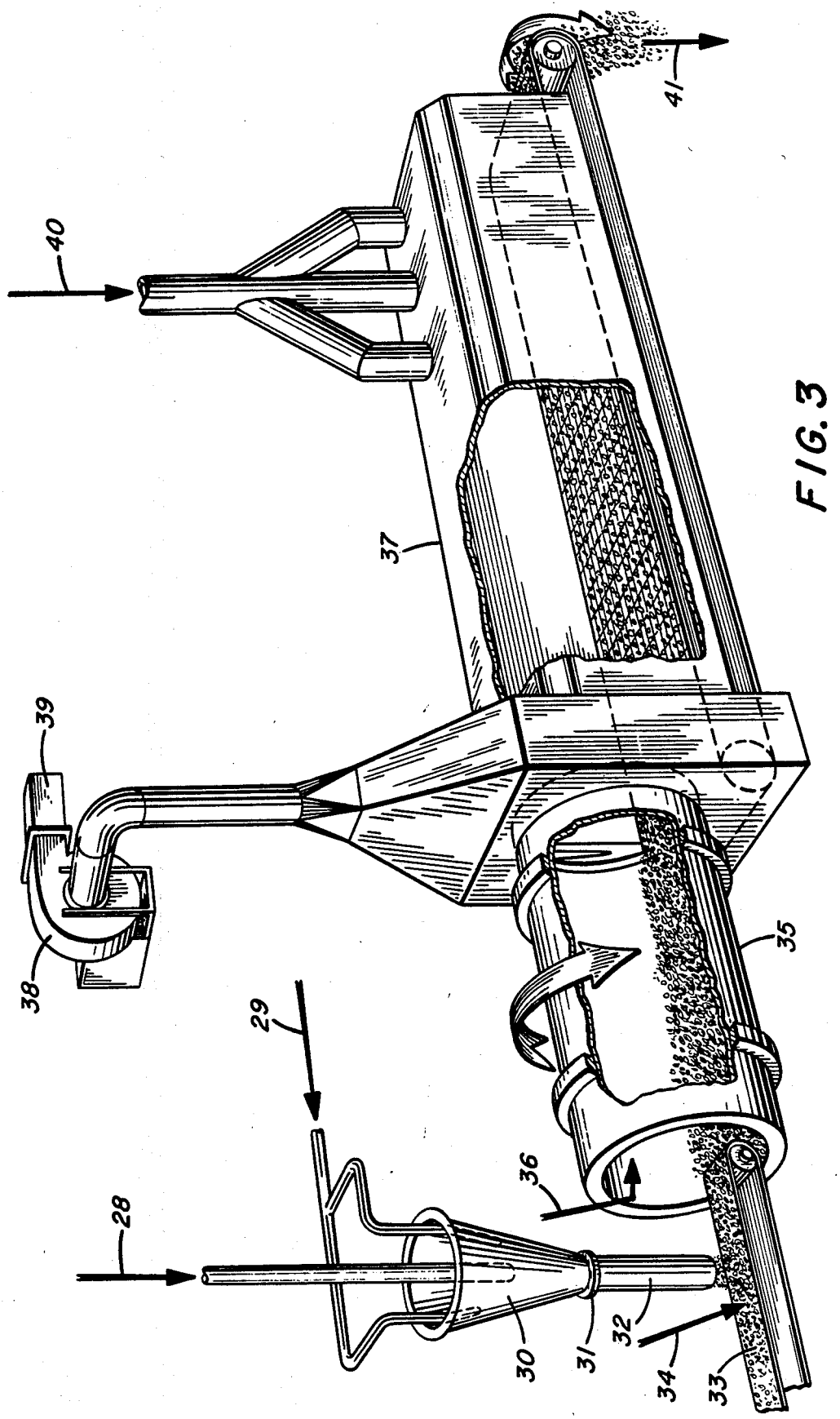

FIG. 3 is an assembly for agglomerating phosphorus furnace feedstock. Binder for agglomeration is prepared by reacting finely divided phosphate ore 28 with phosphoric acid 29 in cone reactor 30. Reacting mixture discharges through orifice 31 and discharge pipe 32. Phosphate ore 33 is fed into agglomerator 35 which is a rotating cylinder. Hydrous silica 34 is added to phosphate ore 33 on belt feeding agglomerator 35 and water 36 is added to agglomerator 35. Reaction between phosphoric acid and finely divided phosphate ore 28 begins in cone reactor 30. Reaction continues as mixture flows through discharge pipe 32, agglomerator 35, and reaction is completed in nonagitated dryer 37.

Exhaust gases 39 from agglomerator 35, dryer 37, and cone reactor 30 are removed by exhaust blower 38. Exhaust gases consist of heated air 40 and air brought into system through various openings. Quantity of air is controlled by draft from blower 38. A hood is provided to collect fumes emitted from reactor 30 but neither hood nor ducts are shown in FIG. 3.

Exhaust gases 39 are directed by means of ductwork to an assembly for making suspension fertilizers. Hardened agglomerates 41 are discharged into feed bins at submerged-arc electric furnaces which are not shown in FIG. 3.

Figure 4:
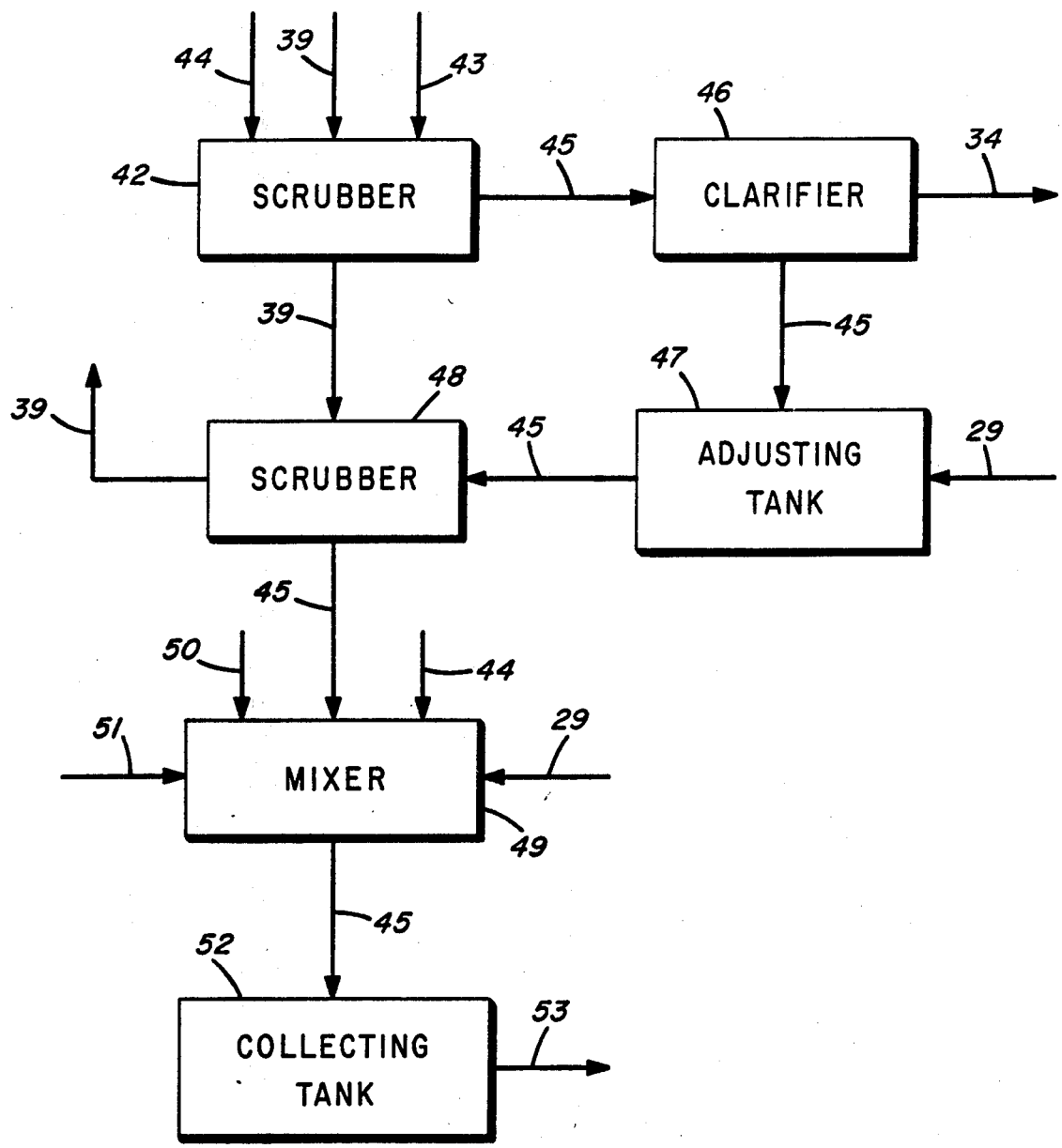

FIG. 4 shows process for making suspension fertilizers. Clarified condenser water 43 having a pH in the range of 5.5 to 6.0 is ammoniated with ammonia 44 to increase the pH to about 8.5. Ammoniated solution is scrubbing medium for high pH scrubber 42. Exhaust gases 39 are treated in high pH scrubber 42. Chemical reactions are as follows.

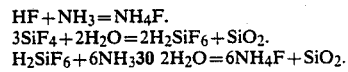

$HF + NH_3 = NH_4F.$
$3SiF_4 + 2H_2O = 2H_2SiF_6 + SiO_2.$
$H_2SiF_6 + 6NH_3 30\ 2H_2O = 6NH_4F + SiO_2.$

Liquid and solid phases in scrubbing medium 45 are separated in clarifier 46. Underflow is hydrous silica 34 and this material is added to phosphate ore 33 in FIG. 3. Scrubbing medium 45 is treated in adjusting tank 47 wherein phosphoric acid 29 is added to lower the pH to range of 5.5 to 6.0. Exhaust gases 39 are scrubbed in low pH scrubber 48 and gases are discharged to atmosphere.

Ammonium phosphate fertilizers are dissolved in scrubbing medium 45. In FIG. 4, scrubbing medium 45 and diammonium phosphate fertilizer 50 are added to mixer 49. Phosphoric acid 29 and ammonia 44 are added to mixer 49 and heat of neutralization increases temperature of mixture about 40° F. thereby increasing the rate of solution of diammonium phosphate. Gelling clay 51 is added to mixer 49 to retard settling of suspended particles. Scrubbing medium 45 is added to collecting tank 52. Suspension fertilizer 53 is pumped to storage.

DISCUSSION OF PRIOR ART

Following are publications which relate to the present invention.

1. "Development of Processes and Equipment for Production of Phosphoric Acid," M. M. Striplin, Jr., Tennessee Valley Authority Chemical Engineering Report No. 2, 1948.
2. "Development of Processes for Production of Concentrated Superphosphate," G. L. Bridger, Tennessee Valley Authority Chemical Engineering Report No. 5, 1949.
3. "Agglomeration of Phosphate Fines for Furnace Use," E. L. Stout, Tennessee Valley Authority Chemical Engineering Report No. 4, 1950.
4. "Production of Elemental Phosphorus by the Electric-Furnace Method," R. B. Burt and J. C. Barber, Tennessee Valley Authority Chemical Engineering Report No. 3, 1952.
5. "Corrosion Problems in the Manufacture of Phosphoric Acid from Elemental Phosphorus," J. C. Barber, Corrosion 14, 21–6, August 1958.
6. "A High-Temperature Superphosphoric Acid Plant," H. Y. Allgood, F. E. Lancaster, Jr., J. A. McCollum, and J. P. Simpson, Industrial and Engineering Chemistry 59, No. 6, 18–28, June 1967.
7. "Waste Effluent; Treatment and Reuse," J. C. Barber, Chemical Engineering Progress 65, No. 6, June 1969.

8. "Solid Wastes from phosphorus Production," J. C. Barber, Chapter VII.2 in book, "Solid Wastes," edited by C. L. Mantell, 1975.
9. "The Recovery of Elemental Phosphorus from Phosphorus Bearing Sludges," William James Shaffner, Doctoral Thesis, The University of Western Ontario, 1975.
10. "A Waste Recovery Story," James C. Barber, Charles B. Hendrix, and David C. Mussleman, CHEMTECH, May 1986.
11. "Use of Phosphoric Acid Sludge To Produce High-Quality Phosphoric Acid," James C. Barber and James G. Stanley, paper presented at the American Chemical Society, Division of Fertilizer and Soil Chemistry, New Orleans, Louisiana, August 30–Sept. 4, 1987.
12. "Recovery of Phosphorus-Containing Liquids in Suspension Fertilizers," James C. Barber, paper presented at the American Chemical Society, Division of Fertilizer and Soil Chemistry, new Orleans, Louisiana, August 30–Sept. 4, 1987.

The following patents are cited as prior art.
1. U.S. Pat. No. 417,943, Dec. 24, 1889, "Process of Obtaining Phosphorus," James Burgess Readman.
2. U.S. Pat. No. 2,999,010, Sept. 5, 1961, "Manufacture of Superphosphoric Acid," Marcus M. Striplin, Jr., David McKnight, and Ellis C. Marks.
3. U.S. Pat. No. 3,050,374, Aug. 21, 1962, "Phosphorus Burner Assembly," Reynold B. Burt and James C. Barber.
4. U.S. Pat. No. 3,084,029, Apr. 2, 1963, "Recovery of Phosphorus from Sludge," James C. Barber, George H. Megar, and Thomas S. Sloan.
5. U.S. Pat. No. 3,113,839, Dec. 10, 1963, "Recovery of Phosphorus from sludge," James C. Barber, George H. Megar, and Thomas S. Sloan.
6. U.S. Pat. No. 3,136,604, June 9, 1964, "Recovery of Phosphorus from Sludge," James C. Barber, George H. Megar, and Thomas S. Sloan.
7. U.S. Pat. No. 3,202,744, Aug. 24, 1965, "Method of Briquetting," James C. Barber, George H. Megar, and Thomas S. Sloan.
8. U.S. Pat. No. 4,081,333, Mar. 28, 1978, "Method and Apparatus for Distillation," William Samuel Holmes, Edward James Lowe, and Ernest Reginal Brazier.
9. U.S. Pat. No. 4,372,929, Feb. 8, 1983, "Energy Conservation and Pollution Abatement at Phosphorus Furnaces," James C. Barber.
10. U.S. Pat. No. 4,421,521, Dec. 20, 1983, "Process for Agglomerating Carbon Particles," James C. Barber.
11. U.S. Pat. No. 4,492,627, Jan. 8, 1985, "Recovery of Phosphorus from Waste Ponds," David A. Crea.
12. U.S. Pat. No. 4,608,241, Aug. 26, 1986, "Production of Phosphorus and Phosphoric Acid," James C. Barber.
13. U.S. Pat. No. 4,613,494, Sept. 23, 1986, "Recovery of Fluorine from Waste Gases," James C. Barber.
14. U.S. Pat. No. 4,619,819, Oct. 28, 1986, "Phosphoric Acid Composition," James C. Barber.
15. "U.S. Pat. No. 4,649,035, Mar. 10, 1987, "Production of Phosphorus and Phosphoric Acid," James C. Barber.
16. U.S. Pat. No. 4,623,528, Nov. 18, 1986, "Recovery of Fluorine from Waste Gases," James C. Barber.
17. U.S. Pat. No. 4,646,035, Mar. 10, 1987, "Production of Phosphorus and Phosphoric Acid," James C. Barber.
18. U.S. Pat. No. 4,670,240, June 2, 1987, "Energy Conservation During the Smelting of Ores," James C. Barber.

EXAMPLE I

Florida pebble phosphate was crushed to provide material smaller than 6 mesh in size. Screen analysis showed that 59 percent was minus 6 mesh, plus 12 mesh and 42 percent was minus 12 mesh. A 500-gram sample of the small sized material was mixed with 50 grams of water in a plastic container. The damp mixture was placed in a bench-scale agglomerator which was a stainless steel cylinder 10 inches in diameter and 18 inches long.

Agglomerator was operated batchwise by installing a plate over the discharge end. Cylinder sloped toward the discharge end at an angle of 3°. Cylinder was rotated counterclockwise at a speed of 60 revolutions per minute.

Merchant-grade wet-process phosphoric acid was injected into tumbling material through openings in a stainless steel sparger tube which was placed at the 5 o'clock position as viewed from the feed end. Sparger was about 1 inch from wall of cylinder. One hundred grams of phosphoric acid was sparged into bed of material over a 9-minute period beginning at start of rotation.

Fifty-five grams of anhydrous ammonia was sparged into rotating cylinder through openings in another stainless steel tube. Quantity of ammonia was stoichiometric amount to form diammonium phosphate, but some of it escaped as a gas. Ammonia sparger was about 1 inch from cylinder wall, and it was located at the 4 o'clock position as viewed from the feed end. Ammonia was added over a 15-minute period beginning at start of rotation. Rotation of cylinder was continued for 5 more minutes, making total time of rotation 20 minutes. A metal spatula was used to divert material spilled from sparger area toward feed end of cylinder.

They batch of agglomerates was removed from cylinder, and they were dried 4 hours in a laboratory oven at 120° C. Average size of agglomerates was approximately ¼ inch. Eighty-nine percent was plus 6 mesh and average crushing strength of ¼-inch agglomerates was 9 pounds.

In this experiment ammonium phosphate formed by neutralizing phosphoric acid with ammonia in agglomerator served as binder. Experiment demonstrated that phosphate ore can be agglomerated by using a phosphate salt as binder.

EXAMPLE II

An agglomerating experiment was carried out with equipment and procedure described in Example I. Formulation for preparing agglomerates was follows.
500 grams of phosphate fines (minus 6 mesh)
50 grams of water
142 grams of phosphoric acid sludge
55 grams of anhydrous ammonia Phosphoric acid sludge is material which settles out when merchant-grade wet-process phosphoric acid is stored or shipped. A sample of acid was obtained for the experiments by collecting material that had settled out in a railroad car used to transport merchant-grade acid from a Florida plant to Muscle Shoals, Alabama. When merchant-grade acid is stored, a sludge is formed from post-precipitation of solid impurities. Therefore, phosphoric acid sludge is a mixture of phosphoric acid and solid impurities. Normal $P_2O_5$ content of phosphoric acid sludge is about 38 percent and normal $P_2O_5$ content of merchant-grade acid is about 52 percent.

Screen analysis of dried agglomerates showed that 80 percent of the material was larger than 6 mesh and 20 percent was smaller than this size. Average size of agglomerates was about ¼ inch and crushing strength of material ¼ inch in size was 8 pounds.

Experiment demonstrated that ammonium phosphate prepared by neutralizing phosphoric acid sludge with ammonia was a satisfactory binder for agglomeration of phosphate ore. The experiment demonstrated that phosphoric acid sludge can be used as source of acid in preparing binder for agglomeration.

EXAMPLE III

The present example gives practical considerations for agglomerating phosphate ore to prepare feedstock for submerged-arc electric furnace.

Bench-scale experiments described in Examples I and II established the following.
1. Salts formed by reacting acidic phosphorus compounds with alkaline substances can be used as binders for agglomerating phosphorus furnace feed material.
2. Binder can be formed in situ.
3. Agglomerates can be hardened by drying at relatively low temperatures.
4. Yield of agglomerates will be high enough in a commercial sized agglomerator for the entire output to be used as product, and recycle of fines will not be necessary.
5. A nonagitated dryer is preferred means of hardening because breakage and deforming of agglomerates is avoided.

Ammonium phosphate formed by reacting phosphoric acid with ammonia was the binder in Examples I and II. However, binder lacked heat stability and agglomerates disintegrated when heated. But binders formed by reacting phosphoric acid with alkaline calcium compounds formed calcium phosphate salts which are heat stable.

Procedures and equipment described in Examples I and II were used to agglomerate phosphate ore, but alkaline calcium compounds were used instead of ammonia. Tests were made which showed that agglomerates prepared with calcium phosphate binder would keep their strength until they nearly reached the reaction zone of the phosphorus furnace.

Binder was prepared by reacting phosphoric acid with finely divided phosphate ore to form calcium phosphate. Agglomerates were prepared in bench-scale equipment described in Example I. As a result of the experiments, finely divided phosphate ore became the preferred alkaline substance for making the binder. In this agglomeration method, finely divided phosphate used in making the binder will be a source of phosphate for production of elemental phosphorus.

EXAMPLE IV

A process was developed at the TVA National Fertilizer Development Center for production of concentrated superphosphate fertilizer. Thermal phosphoric acid was mixed with finely divided phosphate ore in a cone shown in FIG. 3. Mixture discharged onto a conveyor belt. Reaction began in cone and continued on conveyor belt. Mixture set up as a porous monolithic mass as reaction progressed. Stationary knives scored the mass on conveyor belt. Material was disintegrated at end of conveyor belt and disintegrated material was conveyed to storage for the chemical reaction between phosphoric acid and finely divided phosphate ore to be completed. After 2 to 3 months storage, material was distributed as concentrated superphosphate fertilizer.

Proportions of phosphoric acid and phosphate ore were normally adjusted so that $P_2O_5$:CaO mole ratio was about 0.93 and the main constituent of the fertilizer was monocalcium phosphate monohydrate.

Cone mixer used to contact phosphoric acid and finely divided phosphate ore was 27½ inches high and 18 inches in diameter at the top. It was constructed of American Iron and Steel Institute (A.I.S.I) Type 316 stainless steel. A flared section was provided at top of cone. Angle between cone mixer and horizontal was 75°, and a 6-inch-long nozzle was provided at bottom to serve as an extension and direct material onto conveyor belt. Diameter of nozzle was 2 to 2½ inches depending on production rate. With a nozzle diameter of 2 inches, production rate was about 22 tons per hour of concentrated superphosphate fertilizer.

Finely divided phosphate ore was fed into cone mixer through a vertical pipe 4 inches in diameter. Pipe extended into cone mixer from the top.

Phosphoric acid was added to cone mixer from the top through four 1-inch-diameter acid lines which were equally spaced around top of cone. Phosphoric acid discharged through ¾-inch nipples disposed so as to give a swirling motion to mixture of finely divided phosphate ore and phosphoric acid.

Cone mixer described above was accepted by the fertilizer industry for production of concentrated superphosphate as well as triple superphosphate. The latter was made by combining phosphate ore with wet-process phosphoric acid. Most of the triple superphosphate fertilizer has been made by reacting phosphoric acid sludge with finely divided phosphate ore. A use was provided for part of the unwanted byproduct made during production of wet-process phosphoric acid.

Cone reactor 30 in FIG. 3 was copied from cone mixer used in manufacture of concentrated superphosphate fertilizer. However, discharge pipe 32 will discharge reacting mixture into agglomerator 35 instead of onto a conveyor belt.

EXAMPLE V

Agglomerator shown in FIG. 3 was adapted from fertilizer granulators. The term "granular" as applied to fertilizers describes a product the greater part of which passes a 5-mesh sieve and is retained on a 16-mesh sieve. The particles have mean diameters in the range of 1 to 4 millimeters. Granulation is the process of making particles having this desired size. Granulation may be achieved by disintegrating large sized material or by combining small particles into clusters.

Agglomeration has been defined as "the assembling, massing, or clustering of objects in juxtaposition," with little or no implication regarding properties of the assembled objects. In chemical engineering parlance, agglomeration has been defined as any process whereby small particles are gathered into larger permanent masses in which the original particles can be identified.

Agglomerators such as the one shown in FIG. 3, item 35, are commonly used for granulation. Horizontal rotary cylinder has a smooth interior surface and rotation imparts a tumbling, rolling, or cascading action to the materials. Rotation imparts mechanical force that brings particles of the mass into repeated contact with each other so that natural forces of cohesion can operate. Granulation occurs when fertilizer contains the optimum proportion of fluid phase for agglomeration of solid particles. Fluid is normally water and it may be introduced either before or immediately after the fertilizer enters the rotating cylinder. FIG. 3 shows water being injected into agglomerator 35 as indicated by 36. However, water can be added to cone reactor 30. Water serves as wetting agent or plasticizer.

Aggregates formed near feed end of agglomerator 35 are compacted into firm, discrete granules during the remainder of advance through cylinder. Warm, freshly prepared concentrated superphosphate can be granulated without adding water. Phosphoric acid 29 provides enough fluid to form aggregates.

Material builds up on inside of cylinder when concentrated superphosphate is granulated, but this is an advantage instead of a disadvantage. Rolling and tumbling of material in cylinder is improved by buildup.

It has been found that most efficient aggregation of particles occurs when cylinder is rotating at 50 percent of its critical speed when critical speed is defined as that speed at which material begins to be carried completely around the cylinder by centrifugal action. Critical speed in revolutions per minute is calculated by the formula $76.5/\sqrt{d}$ where d is the diameter in feet. Movement of material at one-half critical speed facilitates uniform mixing of liquid and solid and provides a shearing action on the material that inhibits formation of oversize aggregates. In bench-scale agglomeration described in Examples I and II, cylinder rotated at about half of critical speed.

Assemblies for granulation of concentrated superphosphate are normally provided with equipment for fines recycle. Plus-5-mesh material is crushed to a size smaller than 5 mesh. Minus 16-mesh material is screened out and returned to granulator by means of conveyor belts.

Agglomerator 35 in FIG. 3 is similar to granulators used to granulate concentrated superphosphate fertilizer and triple superphosphate fertilizer. Fertilizer granules are normally dried in a rotary dryer wherein breakage occurs and it is necessary to recycle fines. In FIG. 3, fines formation is avoided by drying freshly prepared agglomerates in nonagitated dryer 37. No provision is made for recycle of fines in FIG. 3.

EXAMPLE VI

The present example describes a process for hardening freshly prepared agglomerates on a nonagitated drying device. Similar devices are used to harden agglomerated phosphate ore by calcination at temperatures of about 2200° to 2400° F. The calcining equipment is called a travelling grate.

Agglomerated ore was fed onto travelling grate at a rate of 706 pounds per hour. Material used in this manner is called "bedding material" and it protects metal from excessive heat. Phosphate shale was agglomerated by briquetting at a rate of 2334 pounds per hour and agglomerated ore was fed to travelling grate and placed on top of bedding material. Material was conveyed through furnace heated by a burner. Carbonaceous material in shale burned to provide additional heat. Briquets were hardened at a temperature of 2300° F.

Hardening was achieved by changes in crystal structure whereby crystal interlocking occurs.

In FIG. 3, agglomerates are dried on a wire mesh similar to a travelling grate. Heat for drying agglomerates is derived from hot air 40. Temperature is well below that at which metal will be damaged and no bedding material is required. However, temperature is high enough to volatilize combined water in monocalcium phosphate monohydrate. Combined water is volatilized at about 212° F. Upper limit of temperature may be as high as 1200° F. Hardened agglomerates 41 are discharged into feed bins at submerged-arc electric furnace. Hot agglomerates are smelted thereby conserving electric energy.

Exhaust gases are removed by exhaust blower 38. Exhaust gases 39 are treated in a process to make suspension fertilizer.

EXAMPLE VII

Microscopic examinations were made on samples of phosphate ores which had been heated to various temperatures. The data provide information on characteristics of agglomerates hardened by drying and by calcination. Results of examinations are given in table 1.

Phosphate mineral in phosphate ore is an apatite phase existing as discrete grains of microscopic size. Individual grains are dense, massive aggregates of colloidal to cryptocrystalline particles containing firmly held water. Finely divided clays, hydrated iron oxide and silica (quartz or cherty silica) are commonly occluded in apatite particles, but in widely differing amount from particle to particle. Apatite having characteristics described above is called collophane.

Existing processes for agglomerating phosphate ore involve heating the material to high temperatures. In one process, phosphate ore is heated enough to partially melt the material and thereby provide a fluid phase. Thus agglomerates are formed by tumbling in a rotary kiln and the process is called nodulizing. A large amount of energy is required to heat the ore enough for partial fusion.

In another process, phosphate ore is performed into agglomerates by pressure such as occurs in a briquetting machine. Clay present in ore may serve as binder, or clay may be added to provide binder. Agglomerates are then hardened by heating. When the ore is performed in this manner, material is not heated enough to melt a significant amount of material, but surface melting may occur.

TABLE 1

| Results of Optical Examinations of Samples of Heated and Unheated Phosphate Ores | | |
|---|---|---|
| Sample No. | Description of sample | Results of optical examination |
| 1 | Composition 34 percent unbeneficiated phosphate ore mined in Tennessee. 66 percent beneficiated phosphate ore mined in Tennessee. | Briquets consisted of two principal phases; they were coarse, angular sand grains ($SiO_2$) cemented together by aggregates of colloidal apatite known as collophane. Collophane exhibits usual optical properties for Tennessee ore; it has a mean refractive index of 1.610 which varies over a range of 1.600 to 1.615, depending on the iron content. Collophane is |

TABLE 1-continued

Results of Optical Examinations of Samples of Heated and Unheated Phosphate Ores

| Sample No. | Description of sample | Results of optical examination |
|---|---|---|
| | Mixture was briquetted, but briquets were not heated. | stained by hydrated ferric oxide, or limonite. Clay of illite type is intimately associated with collophane masses. Briquetting and drying at 110° C. caused no noticeable changes in characteristics of materials. |
| 2 | Composition same as 1. Sample was heated 2 hours at 1200° F. | No marked alterations of individual particles were observed and there was no apparent interaction between phases. Apatite optical properties were same as for collophane. Quartz particles showed no evidence of surface melting or interaction. Gross sample exhibited a deepening in color caused by formation of blood-red iron oxide. |
| 3 | Composition 75 percent unbeneficiated ore mined in Tennessee. 25 percent Florida pebble phosphate. Mixture was briquetted and heated in shaft kiln at 1800° F. | There was no marked alteration of individual phases, and there was no apparent interaction between phases. Apatite optical properties were essentially the same as for sample 1. Fluxing or melting on thin edges of apatite particles did not occur. Gross sample had a deepening color caused by thermal dehydration of limonite pigment, resulting in formation of blood-red hematite. Silica particles are mainly quartz and they show no sign of surface melting or interaction. |
| 4 | Composition same as 3. Mixture was briquetted and heated in laboratory furnace 6 hours at 2000° F. | A pronounced color change occurred by heating. This resulted from a conversion of pale yellow limonite pigment to blood-red crystallites of hematite. Apatite and silica phases show practically no alteration from their original form. Apatite particles are similar to unbeneficiated and unheated ore mined in Tennessee. The only change is a slight increase in the mean refractive index from 1.610 to 1.615. This was attributed to a slight increase in crystalline size and elimination of nonessential water associated with collophane. Quartz particles were slightly altered by formation of thin veneers of vitreous silica glass. |
| 5 | Composition same as 3. Mixture was briquetted and heated in rotary kiln at a temperature in the range of 2400°-2500° F. | Heating resulted in alteration of individual phases, and it is likely there was interaction between phases. Hydrated iron oxide, limonite, had changed to black, opaque, spinel mineral, magnetite, which by reflected light appears dark gray. Silica particles frothed or bloated. Surface coatings of vitreous silica glass having a refractive index 1.46 were evident. However, quartz particles had melted without significant interaction with CaO in the phosphate ore. Melting was limited to surfaces and the principal silica phase remained quartz. Collophane particles present in unheated ore had enlarged to crystallites having optical properties approximating those of native fluorapatite. In some cases, a network of glass had developed within crystallite masses as an interstitial phase in aggregates. Glass associated with apatite particles has a variable refractive index with upper range at about 1.600. Calcium metasilicate glass usually has a relatively uniform index in a narrow range of 1.620 to 1.625. Glass encountered in the sample is siliceous and it was not calcium metasilicate slag. However, it might have been a product which resulted from fluxing of quartz silica and clays occluded in apatite particles. Overall, alterations to particles in sample appeared to be melting, and crystal growth in the pre-melting range. |

Following are highlights from optical examinations given in table 1.
1. Heating phosphate ore to 1200° F. resulted in a color change which was attributed to thermal dehydration of pale yellow pigment to blood-red hematite. No physical changes were observed.
2. Heating phosphate ore to 1800° F. continued to show no physical change in characteristics.
3. Heating phosphate ore to 2000° F. resulted in slight increase in refractive index of apatite but physical change was not considered significant. Slight melting of quartz was observed. Overall, no significant changes in physical characteristics of the ore were observed.
4. Heating range of 2400°-2500° F. resulted in significant physical changes which included melting of quartz and growth of colloidal collophane particles to crystallites approaching optical particles of native fluorapatite.

Data in table 1 provide a basis for upper limits on hardening temperature for agglomerates. Combined water in limonite volatilizes at temperatures below 1200° F. But no melting or intereaction between phases occur at temperatures up to 1200° F. Collophane has not been converted to fluorapatite crystals at 1200° F. However, monocalcium phosphate having the molecular proportions $CaO \cdot P_2O_5 \cdot 2H_2O$ is converted to the calcium metaphosphate form $(CaO \cdot P_2O_5)$ by heating to 1112° to 1202° F. Consequently, 1200° F. is taken as the maximum hardening temperature for agglomerates.

EXAMPLE VIII

Ignition loss has been taken to be a measure of the extent of calcination of phosphate ore. Agglomerated phosphate ore having low percentages of ignition loss material denotes the ore has been heated to a high temperature long enough for collophane particles to enlarge into crystallites, and other physical changes have occurred which result in high-strength agglomerates.

An empirical procedure is used to determine ignition loss. Phosphate ore is dried and ground to pass a 150-mesh Tyler screen and samples are heated to 2000° F. for 30 minutes. Percent loss on heating is ignition loss. Material volatilized during the determination includes combined water, carbon dioxide, and fluorine.

Samples of unbeneficiated phosphate ore mined in Tennessee were heated for two hours at various temperatures up to 2000° F. and ignition loss was determined. A linear correlation was obtained between temperature of heating and ignition loss. Unheated phosphate ore had an ignition loss of 5.1 percent and ore that had been heated to 2000° F. had an ignition loss of 0.1 percent.

EXAMPLE IX

Laboratory apparatus was developed for use in determining the relative quantities of elemental phosphorus that may be obtained by the reduction of phosphate ores at high temperatures. A Global-type electric furnace was found to be a suitable heating means. A fused silica tube 1¼ inches outside diameter, 1-inch inside diameter, and 30 inches long was placed in the horizontal furnace. A Variac and ammeter controlled the temperature.

Nitrogen was used as a carrier gas and during an experiment it flowed through the silica tube at a rate of 14 liters per hour. Oxygen and carbon dioxide were removed from the nitrogen and the gas was dried before it was added to the silica tube.

Phosphate, reducing carbon, and silica rock were ground to pass a 100-mesh sieve. The three finely ground materials were mixed in the desired proportions and the mixture was placed in a closed, cylindrical graphite crucible. Mixture was heated 30 minutes at a temperature of 2500° F. Residue in the crucible was analyzed for $P_2O_5$ to determine the quantity that remained. The percentage of phosphorus volatilized during an experiment was taken to be the reducibility of the phosphate ore.

Replicate experiments were made in which $SiO_2$:CaO ratio of the mixture was 0.82 and excess carbon was 104 percent of that required to reduce $P_2O_5$ and $Fe_2O_3$. Replicate analyses were made on residues. Data were treated statistically and it was found overall standard deviation was in the range of 0.40 to 0.80 percent volatilization. Although greater reproducibility of experimental results was desired, effect of variables on reducibility could be determined provided replicate experiments were made for each condition studied.

EXAMPLE X

Experiments were made in the laboratory apparatus described in Example IX to determine the effect of ignition loss on reducibility. Phosphate used in the experiments contained 23.1 percent $P_2O_5$, 32.6 percent CaO, 4.4 percent $Fe_2O_3$, 0.25 percent FeO, and 23.6 percent $SiO_2$. Sufficient metallurgical coke and silica rock was mixed with the phosphate to provide 104 percent of carbon requirement and a $SiO_2$:CaO weight ratio of 0.82.

Prior to preparing the proportioned mixtures of phosphate, reducing carbon, and silica rock, samples of phosphate were heated at various temperatures up to 2000° F. Ignition loss of the samples ranged from 0.17 to 5.1 percent.

Results of reducibility experiments are given in table 2.

TABLE 2

| | Effect of Heating Phosphate Ore on Its Reducibility | | |
|---|---|---|---|
| Ignition loss content of phosphate ore | Heating temperature, °F.[a] | Number of replicate experiments | Average reducibility, percent[b] |
| 0.17 | 2000 | 6 | 75.2 |
| 0.25 | 1950 | 6 | 74.5 |
| 0.34 | 1900 | 6 | 77.7 |
| 0.40 | 1875 | 8 | 77.7 |
| 0.41 | 1875 | 6 | 74.3 |
| 0.50 | 1850 | 9 | 76.9 |
| 0.60 | 1825 | 8 | 76.5 |
| 0.64 | 1800 | 10 | 77.5 |
| 0.64 | 1800 | 10 | 78.6 |
| 0.77 | 1750 | 6 | 76.7 |
| 0.91 | 1700 | 10 | 77.1 |
| 1.08 | 1625 | 6 | 76.7 |
| 1.26 | 1550 | 6 | 78.4 |
| 1.45 | 1475 | 6 | 80.6 |
| 1.93 | 1300 | 6 | 80.5 |
| 2.00 | 1275 | 6 | 82.3 |
| 2.01 | 1275 | 5 | 81.2 |
| 2.43 | 1100 | 6 | 80.9 |
| 3.54 | 650 | 6 | 84.5 |
| 4.90 | 150 | 6 | 85.8 |
| 5.10 | Unheated | 6 | 83.1 |

[a]Temperature estimated from relationship between ignition loss and temperature.
[b]Percent volatilization of phosphorus during experiments carried out as described in Example IX was taken as a measurement of reducibility.

Data in table 2 show that prior heating of phosphate decreases the reducibility in the laboratory experiments. When phosphate is agglomerated by nodulizing n the temperature range of 2300° to 2400° F., average reducibility was only 75.9 percent, but it was 83.1 percent when phosphate ore was unheated. Based on these experiments, heating unbeneficiated phosphate ore prior to smelting adversely affects volatilization of phosphorus. Adverse effects are attributed to the physical changes described in table 1. When data in table 2 are plotted it is evident preheating phosphate ore to 1200° F., and above, has a significant adverse effect on reducibility. Phosphate particles should remain as collophane for maximum reducibility.

EXAMPLE XI

Additional experiments were made to compare the reducibility of unheated phosphate ore with ore which had been agglomerated by heating to high temperatures.

Unheated phosphate ore was a mixture called matrix blend, which was comprised of unbeneficiated phosphate ore mined in Tennessee, and Florida pebble. Unbeneficiated ore was commonly called Tennessee matrix; Florida pebble had been washed to remove clay. Proportions of the two ores was 75 percent Tennessee matrix and 25 percent Florida pebble.

Heated phosphate ore had the same composition as the unheated material. Heated material had been agglomerated by nodulizing, and agglomerates were called nodules. Nodulizing temperature was in the range of 2300° to 2400° F. Although physical examinations of nodules were not made, prior examinations reported in table 1 had shown that the following changes occur during nodulizing.

1. Alterations of individual phases occur with interaction between phases.
2. Limonite changes to magnetite.

3. Silica particles froth and bloat, and quartz particles melt without significant intereaction with CaO to form slag. However, melting is limited to surfaces and the principal silica phase continues to be quartz.
4. Collophane particles enlarge to crystallites which have optical properties similar to native fluorapatite.
5. Overall alterations are melting and crystal growth.

Nodulizing is therefore a process whereby particles aggregate by molten silica and by interlocking of crystals.

Experiments were made with two reducing carbons. One was bituminous coal mined in Kentucky, and the other was metallurgical coke. Proportion of reducing carbon was sufficient to provide 104 percent of the fixed carbon needed to reduce $P_2O_5$ and $Fe_2O_3$ in the mixture. All the iron was assumed to be present as $Fe_2O_3$, although nodulizing may result in reduction of some of the $Fe_2O_3$ to $Fe_3O_4$.

Table 3 gives results of reducibility experiments.

TABLE 3

Effect of Nodulizing Phosphate Ore on Its Reducibility

| Experiment No. | Reducing carbon | Phosphate ore | No. of replicate experiments | Average reducibility,[c]% |
|---|---|---|---|---|
| 1[a] | Kentucky coal | Matrix blend | 3 | 89.4 |
| 2[a] | Kentucky coal | Nodules | 3 | 88.3 |
| 3[a] | Metallurgical coke | Matrix blend | 3 | 82.9 |
| 4[b] | Metallurgical coke | Nodules | 3 | 75.1[d] |

[a]$SiO_2$:CaO weight ratio was 0.85.
[b]$SiO_2$:CaO weight ratio was 0.82.
[c]Experimental procedure was described in example IX.
[d]Prior experiments with metallurgical coke and nodules gave average reducibility of 77.8 for six replicates.

Conclusions from data in table 3 are as follows.
1. Matrix blend had a higher reducibility than nodules, thus providing further evidence that preheating phosphate ore does not increase reducibility.
2. Reducibility of phosphate ores is greater with bituminous coal than it is with metallurgical coke.

EXAMPLE XII

Anhydrous monocalcium phosphate is the preferred binder for agglomeration. Binder is formed by the same process for the manufacture of concentrated superphosphate by quick curing. The publication, "Development of Processes for Production of Concentrated Superphosphate," provides information on fluorine loss when concentrated superphosphate is made by the quick-curing process. The present example is taken from chapter VI in the publication.

Pilot-plant studies were carried out in an assembly consisting of the following equipment.
1. Cone mixer similar to the one shown in FIG. 3.
2. Conveyor belt for transporting freshly mixed material from mixer to dryer.
3. Doctor blades to score material on conveyor belt.
4. Disintegrator at end of conveyor belt.
5. Rotary dryer.

From pilot-plant experiments recommendations given in table 4 were made for commercial production of concentrated superphosphate by the quick-curing process.

TABLE 4

Recommendations for Manufacture of Concentrated Superphosphate by the Quick-Curing Process

| | |
|---|---|
| Mixing conditions | |
| Phosphoric acid concentration | 68% |
| Phosphoric acid temperature | 100° F. |
| $P_2O_5$:CaO mole ratio | 0.93 |
| Mixing mode | Continuous |
| Mixer-belt retention time | 6 minutes |
| Disintegration of freshly mixed material | Battery of four squirrel-cage disintegrators |
| Curing conditions | |
| Dryer conditions | Direct-fired rotary dryer with counter-current operation |
| Dryer loading | 14% |
| Maximum gas velocity in dryer (actual conditions) | 5 ft./second |
| Dryer retention time | 2.8 hrs. |
| Dryer inlet gas temperature | 220° F. |
| Gas:feed ratio | 1.1 c.f.m. (at 100° F., N.P. )(lb feed)(hr.) |
| Chemical characteristics of product | |
| Moisture content | 3% |
| Conversion | 89% |
| Free acid content | <3% |
| Product temperature | 150° F. |
| Dust loss from dryer | <7% (99% of dust loss from dryer recoverable in cyclone dust collector) |

Some of the recommendations in table 4 serve as a guide to preparing monocalcium phosphate binder. But there are major differences, as discussed below.
1. Mixing conditions are closely controlled when fertilizers are produced in order to prevent formation of insoluble phosphorus compounds. In making the binder there is greater freedom in the choice of operating conditions.
2. Freshly mixed concentrated superphosphate is allowed to set up as a monolithic mass. But freshly mixed material will consolidate between particles of phosphate ore in agglomeration. Consolidated material will cement discrete particles into agglomerates.
3. Rotary dryer is not the preferred method of drying agglomerates. Freshly prepared agglomerates are easily deformed and flights in dryer are expected to make fines. Fines will not be formed by a nonagitating type of dryer.
4. High temperatures are avoided in making fertilizer because insoluble phosphorus compounds are formed. But higher drying temperatures can be used when agglomerates are hardened. Agglomerates may be heated to a temperature high enough to volatilize water from monocalcium phosphate in which case binder will be converted into polymerized calcium metaphosphate having the formula $[Ca(PO_3)_2]_n$, or the formula may be given as $[CaO \cdot P_2O_5]_n$.
5. Agglomerates will be completely dried, whereas table 4 shows the recommended moisture content of concentrated superphosphate fertilizer to be 3 percent.

EXAMPLE XII

Fluorine is lost by volatilzation when concentrated superphosphate fertilizer is being prepared. Additional fluorine is lost when the freshly mixed material is heated.

Small-scale experiments were made to determined the quantity of fluorine lost when one-day old concentrated superphosphate fertilizer is heated to various temperatures for different times. Data are given in table 5.

The fluorine volatilized is amenable to recovery as ammonium fluoride. Since ammonium fluoride byproduct is valuable, data in table 5 can be used in economic studies to determine optimum drying temperature. Table 5 shows that fluorine loss varies from 49 to 78 percent. The $P_2O_5$:CaO mole ratio, heating time, and temperature may be varied to give the greatest return.

TABLE 5

Fluorine Loss by Heating One-Day-Old Concentrated Superphosphate Fertilizer[a]

| $P_2O_5$:CaO mole ratio | Heating time, minutes | Temperature, °F. | Fluorine loss, % of fluorine in phosphate ore[b] |
|---|---|---|---|
| 0.93–0.95 | 15 | 392 | 49 |
| 0.93–0.95 | 30 | 392 | 51 |
| 0.93–0.95 | 45 | 392 | 52 |
| 0.93–0.95 | 60 | 392 | 52 |
| 0.93–0.95 | 180 | 392 | 54 |
| 1.27–1.30 | 15 | 392 | 49 |
| 1.27–1.30 | 30 | 392 | 61 |
| 1.27–1.30 | 45 | 392 | 78 |
| 1.27–1.30 | 60 | 392 | 66 |
| 1.27–1.30 | 180 | 392 | 72 |
| 0.90–0.93 | 15 | 572 | 55 |
| 0.90–0.93 | 30 | 572 | 58 |
| 0.90–0.93 | 45 | 572 | 52 |
| 0.90–0.33 | 60 | 572 | 61 |
| 0.90–0.93 | 180 | 572 | 66 |
| 1.24–1.27 | 15 | 572 | 49 |
| 1.24–1.27 | 30 | 572 | 61 |
| 1.24–1.27 | 45 | 572 | 65 |
| 1.24–1.27 | 60 | 572 | 69 |
| 1.24–1.27 | 180 | 572 | 72 |

[a]Data are reported in table XXX, Chemical Engineering Report No. 5.
[b]Fluorine loss was calculated from a CaO balance.

EXAMPLE XIV

Phosphate ore was nodulized to agglomerate feedstock for phosphorus furnaces. Fluorine compounds in the form of $SiF_4$ and HF were volatilized and gases were scrubbed with water to collect fluorine compounds.

A side stream of gases ahead of the scrubber was sparged into a bottle containing water. The purpose was to prepare a sample of fluorine-containing liquor for experimentation to remove $P_2O_5$, $SiO_2$, and $Fe_2O_3$. The pH was maintained in the range of 5 to 6 by addition of aqua ammonia during the time the gas was being sparged into the bottle. When the F concentration reached 1.8 percent it was treated with 500 percent of the stoichiometric quantity of ferric sulfate to remove $P_2O_5$ and the resulting liquor was ammoniated with aqua ammonia to a pH of 8.5 to precipitate silica and iron. Precipitates were removed from the treated liquor by filtering.

Analyses of liquor before and after purification treatment are given in table 6.

TABLE 6

Analysis of Fluorine-Containing Liquor

| | Analysis, percent | | | |
|---|---|---|---|---|
| | F | $P_2O_5$ | $SiO_2$ | $Fe_2O_3$ |
| Analysis of liquor before purification | 1.80 | 0.19 | — | — |
| Analysis of liquor after purification | 1.48 | 0.004 | 0.004 | <0.001 |

The F:$SiO_2$ ratio in the purified solution was 370, and fluorine compounds were converted to ammonium fluoride. Silica was precipitated and it was effectively separated from liquid phase by filtering, resulting in almost complete removal of $SiO_2$.

EXAMPLE XV

A sample of liquor was obtained by the same procedure as that described in Example XIV. Sample was ammoniated to a pH of 9 and, after ammoniation, precipitates were removed by filtering. Data on removal of various constituents are given in table 7.

TABLE 7

Removal of Constituents in Liquor by Ammoniating to pH of 9.0 and Filtering

| Constituent | Percent removed |
|---|---|
| $SiO_2$ | 96 |
| $Fe_2O_3$ | 72 |
| $P_2O_5$ | 13 |
| Fluorine | <1 |

Experimental data demonstrated that treatment of condenser water with ammonia to increase pH to 9.0 precipitated $SiO_2$ and $Fe_2O_3$. Both $SiO_2$ and $Fe_2O_3$ precipitated in this manner are hydrous materials which have been found to increase hardness of agglomerates when agglomerates are formed by tumbling as shown in FIG. 3.

EXAMPLE XVI

Suspension fertilizers are made commercially by dissolving ammonium phosphate fertilizers in water. Three ammonium phosphate fertilizers are used and they are monoammonium phosphate (MAP), diammonium phosphate (DAP), and ammonium polyphosphate (APP). Chemical heat is generated to increase the temperature of water and thereby increase rate of solution. A gelling clay is added to keep crystallized ammonium phosphate as well as other solids in suspension.

Basic suspension fertilizers are made which have the grades 9-27-0, 10-30-0, and 11-33-0. Other ingredients such as muriate of potash and nitrogen solutions are added to prepare mixtures having the desired proportions of nutrients—N, $P_2O_5$, and $K_2O$.

Formulation for 11-33-0 suspension fertilizer, made by dissolving MAP in water, is given in table 8. The 11-33-0 grade is preferred because it contains 10 percent more nutrients than 10-30-0 and 22 percent more nutrients than 9-27-0.

TABLE 8

Formulation for Making 11-33-0 Suspension Fertilizer from MAP

| | Pounds per ton 11-33-0 |
|---|---|
| MAP (11-52-0) | 1269 |
| Anhydrous ammonia | 97 |
| Water | 604 |
| Gelling clay | 30 |

TABLE 8-continued

Formulation for Making 11-33-0 Suspension Fertilizer from MAP

| | Pounds per ton 11-33-0 |
|---|---|
| Total | 2000 |

Reaction between anhydrous ammonia and monoammonium phosphate generates heat, and temperature of mixture is increased about 40° F. Reaction between anhydrous ammonia and APP will give a similar rise in temperature. Rates of solution are high enough for the process to be practical. In the case of DAP, insufficient heat is generated to obtain a rate of solution which is high enough for commercial application. Consequently, phosphoric acid is included in the formulation when DAP is dissolved in water. Reaction between phosphoric acid and ammonia provides the desired temperature rise.

EXAMPLE XVII

When phosphate ores are smelted a gas mixture is obtained which consists mainly of carbon monoxide, hydrogen, and elemental phosphorus. Air is brought into gas stream with feedstock and through openings in furnace roof, causing elemental phosphorus to burn and form $P_2O_5$.

Gases may be treated in electrostatic precipitators to remove dust after which gases are contacted with water to condense elemental phosphorus. Water used to condense elemental phosphorus is called condenser water and it is recirculated from a sump to condenser.

Fluorine compounds ($SiF_4$ and $HF$) are volatilized during smelting and gas from smelting furnace contains these compounds. Since gas mixture contains $P_2O_5$, pH of recirculating condenser water will be decreased to 2.0, or lower, because of the presence of phosphoric acid, fluosilicic acid, and hydrofluoric acid. The acids are highly corrosive, and alkaline materials such as ammonia or soda ash are used to neutralize condenser water and prevent corrosion.

When condenser water is neutralized with ammonia the salts ammonium fluoride, ammonium fluosilicate, and ammonium phosphate are formed. Sodium and potassium compounds volatilize from the furnace and these compounds are carried over in condenser water. Sodium fluosilicate and potassium fluosilicate are formed and these compounds are slightly soluble in condenser water. When cooling coils are used to cool condenser water, sodium and potassium fluosilicates precipitate as tenacious scales on cooling surfaces. Also, condenser water is cooled when it flows through spray nozzles, exposed piping, and pumps. Fluosilicate scales are particularly troublesome when sodium, potassium, and fluosilicic acid are present in condenser water, and recovery of elemental phosphorus is affected by absence of cooling coils.

When condenser water is nutralized with soda ash, ample sodium is provided for formation of sodium fluosilicate. Ammonium fluosilicate is more soluble than sodium fluosilicate, and ammonia is preferred as a neutralizing agent.

One object of the invention is to recycle phosphorus-containing solids by processes which upgrade the feedstock. When unbeneficiated ores are smelted, feedstock usually contains clay, and larger quantities of sodium and potassium compounds will be carried over into condenser water. The fluosilicate scale problem will be made worse by smelting unbeneficiated ores.

EXAMPLE XVIII

Dissolved and suspended solids accumulate in condenser water as a result of its continued reuse. The recirculating water becomes saturated with fluosilicate salts are explained in Example XVII. A stream of recirculating condenser water must be bled off and replaced with fresh water to prevent fluosilicates from depositing on equipment as scales. Water bled from the condensing system is called phossy water.

Recirculating condenser water is saturated with elemental phosphorus, colloidal particles of the element are suspended, and particles larger than colloids become suspended. Elemental phosphorus, fluorine chemicals, and nutrients are water pollutants. consequently, watercourses and ground water must be protected from phossy water.

In the publication, "Waste Effluent; Treatment and Reuse,"0 a process was described to reuse phossy water in the condensing system, said process being comprised of the following steps.

1. A stream of phossy water was bled from recirculating condensing water.
2. A flocculant was added to phossy water.
3. Phossy water was clarified.
4. Clarifier underflow was centrifuged to recover elemental phosphorus, but a phosphorus-containing solid residue was obtained as waste.
5. Clarified phossy water was recycled.
6. A stream of clarified phossy water was bled off.
7. Clarified bleedoff was further clarified in a 14-acre settling pond.
8. Pond overflow was an effluent which was discharged into a watercourse.

Effluent in step 8 contained elemental phosphorus which was dissolved in water, and it contained colloidal phosphorus particles. Effluent was therefore toxic because it contained elemental phosphorus. Therefore, the process described in "Waste Effluent; Treatment and Reuse" is inadequate to meet current environmental requirements.

Under "Objects of the Invention," object No. 2 is to develop uses for phossy water and it will become a byproduct instead of a hazardous waste. The most promising use was feedstock for production of suspension fertilizers.

When phossy water is used in suspension fertilizers, elemental phosphorus is oxidized to $P_2O_5$ and the resulting phosphoric acid will be neutralized with ammonia to form ammonium phosphate. Therefore, elemental phosphorus will be utilized as a nutrient. Combined phosphorus and combined potassium will be recovered as nutrients, although the quantity of combined potassium is small. Fluorine present as the fluoride will permit high concentration of suspension fertilizers to be produced.

EXAMPLE XIX

From data in "Waste Effluent; Treatment and Reuse," quantities of phossy water, nutrients, and fluorine in bleedoff were calculated, and the results are given in table 9.

TABLE 9

Quantities of Phossy Water, Nutrients, and Fluorine in Bleedoff

|  | Lbs/ton elemental phosphorus produced |
|---|---|
| Phossy water | 671.0 |
| $P_2O_5$ | 11.0 |
| N | 7.5 |
| F | 1.0 |

EXAMPLE XX

The preferred method of handling precipitator dust is to slurry the material with clarified phossy water. Precipitator dust contains soluble constituents, and some of the constituents will be dissolved in phossy water. Exploratory experiments were made to determine the proportions of $P_2O_5$, $K_2O$, and F that can be extracted by leaching with water, $H_2SO_4$, and HCl solutions at 100° C. Overall results were as follows:

|  | Percent removed by leaching |
|---|---|
| $P_2O_5$ | 37.0–93.0 |
| $K_2O$ | 49.0–87.0 |
| F | 30.0–50.0 |

When precipitator dust is slurried with clarified phossy water the quantities of $P_2O_5$, $K_2O$, and F that will be dissolved are not known accurately. Nevertheless, estimates were made based on meager data from leaching experiments, and results are given in table 10.

TABLE 10

Estimated Quantities of Nutrients and Fluorine Leached from Precipitator Dust During Slurrying

|  | Lbs/ton elemental phosphorus produced[a] |
|---|---|
| $P_2O_5$ | 22.3 |
| $K_2O$ | 14.7 |
| F | 3.1 |

[a]Based on production of precipitator dust at a rate of 0.062 ton per ton elemental phosphorus produced.

Quantities in table 10 are in addition to quantities given in table 9.

EXAMPLE XXI

Phosphate ores are mineral apatites which contain both phosphorus and fluorine. Beneficiated phosphate ores usually contain 80 to 90 percent apatite. However, unbeneficiated material may be used as feedstock to produce elemental phosphorus, and the proportion of apatite will be substantially less than 80 to 90 percent.

The basic mineral in phosphate ores is fluorapatite—$Ca_{10}(PO_4)_6F$—but nearly all phosphates contain fluorapatite in a modified form whereby carbonate and fluorine are substituted for phosphate, and some calcium is replaced by other metals.

Fluorapatite contains 3.77 percent fluorine and 42.2 percent $P_2O_5$ giving an $F:P_2O_5$ weight ratio of 0.089. In most phosphates, however, $F:P_2O_5$ weight ratio is higher than it is in fluorapatite—up to 50 percent higher—because part of the phosphate normally present in the mineral has been replaced by carbonate and fluorine.

Fluorapatite mineral having an $F:P_2O_5$ weight ratio of 0.089 does not readily lose fluorine by heating. The mineral has to be heated to temperature well above 2000° F. before significant amounts of fluorine volatilize. But commercial phosphates begins to lose fluorine at temperature well below 2000° F. because nonapatitic fluorine in the ore is more readily volatilized.

The quantity of fluorine volatilized during smelting of phosphate ores varies with $F:P_2O_5$ weight ratio in feedstock. When the ore has been heated to high temperatures prior to smelting, some of the fluorine will volatilize and the $F:P_2O_5$ ratio will be reduced. Less fluorine will be volatilized during smelting. Fluorine from smelting is collected in precipitator dust, phosphorus sludge, and condenser water.

A linear equation was derived for estimating the quantity of fluorine collected in condenser water with $F:P_2O_5$ weight ratio as a variable. The equation is based on a few determinations of the quantity of fluorine collected with different $F:P_2O_5$ weight ratios. The equations is $$F = 3129R - 250,$$

where
F = fluorine in condenser water, pounds per ton phosphorus produced, and
R = $F:P_2O_5$ weight ratio in phosphate ore smelted.
However, the equation given above will not apply for feedstock having a weight ratio less than 0.089.

EXAMPLE XXII

Estimates were made of the amounts of nutrients, fluorine, and salts in condenser water when unbeneficiated phosphate ore is agglomerated by the process illustrated in FIG. 3. Composition of the phosphate ore is given in table 11.

TABLE 11

Composition of Unbeneficiated Phosphate Ore

| Constituent | Percent on dry basis |
|---|---|
| $P_2O_5$ | 22.0 |
| CaO | 31.4 |
| $SiO_2$ | 27.7 |
| $Fe_2O_3$ | 5.3 |
| $Al_2O_3$ | 9.7 |
| F | 2.31 |

For the estimates it was assumed phosphorus-containing solids—precipitator dust, phosphorus sludge, and clarifier underflow—would be fluidized in equipment shown in FIG. 1. Ten percent of elemental phosphorus produced would be mixed with the phosphorus-containing solids. The fluidized mixture would be burned and an impure phosphoric acid mixture would be prepared. The acid would be used to make binder for agglomeration of phosphate ore. Quantities of materials collected in condenser water under these conditions were calculated and results are given in table 12.

TABLE 12

Amounts of Nutrients, Fluoride, and Salts Collected in Condenser Water

|  | Quantity, lb/ton phosphorus produced |
|---|---|
| Nutrient |  |
| $P_2O_5$ | 33.3 |
| N | 112.8 |
| $K_2O$ | 14.7 |
| Fluorides | 141.1 |
| Salts |  |
| $(NH_4)_2HPO_4$ | 61.8 |
| KF | 18.1 |
| $NH_4F$ | 263.6 |

EXAMPLE XXIII

EXAMPLE XXIII

The 11-33-0 grade suspension fertilizer described in Example XVI is not normally produced because commercial ammonium phosphate fertilizers contain too much metal impurities. Strong gels are formed and the 11-33-0 suspension solidifies during storage. The lower grade suspensions—9-27-0 and 10-30-0—are normally produced, although cost savings would result from producing the more concentrated 11-33-0.

A laboratory study carried out at the TVA National Fertilizer Development Center revealed that the major cause of strong gel formation in 11-33-0 was the incongruent dissolution of $FeNH_4(HPO_4)_2$ and $AlNH_4(HPO_4)_2$ phases introduced by the MAP, followed by the reprecipitation of Fe and Al as amorphous $FePO_4 \cdot nH_2O$ and $AlPO_4 \cdot nH_2O$ gels. The gels entrap and bind free water, resulting in a progressive increase in viscosity and eventual solidification of the 11-33-0.

The TVA study further revealed that fluorine was an important variable affecting viscosity. Adding fluorine lowered the viscosity of suspension products and prolonged their storage stability. Laboratory studies showed that high levels of fluorine promoted the formation of $FeNH_4PO_4F_2$ and $AlNH_4PO_4F_2$ which are much more stable during storage than $FeNH_4(HPO_4)_2$ and $AlNH_4(HPO_4)_2$. The latter decompose to gelatinous $FePO_4 \cdot nH_2O$ and $AlPO_4 \cdot nH_2O$.

EXAMPLE XXIV

In the present example, ammonium phosphate fertilizer is dissolved in water to make suspension fertilizer as described in Example XVI. However, APP is used instead of MAP. The formulation is given in table 13.

TABLE 13

Formulation for Production of 11-33-0 Suspension from APP (12-54-0)

|  | Lb/ton 11-33-0 suspension fertilizer |
|---|---|
| APP | 1222 |
| $NH_3$ | 89 |
| Water | 659 |
| Gelling clay | 30 |
| Total | 2000 |

Table 12 shows that a substantial amount of fluoride salts are collected in condenser water. When ammonium phosphate fertilizer is dissolved in phossy water, fluorine will promote formation of the stable compounds, $FeNH_4HPO_4F_2$ and $AlNH_4PO_4F_2$. The tendency of 11-33-0 to form strong gels and solidify will be lessened, although further research is needed to determine the effect of fluoride addition on gelling.

Calculations were made to determine the quantities of suspension fertilizer that would be made for various assumed percentages of F in clarified phossy water. In making the calculations it was assumed that APP would be dissolved in phossy water. Results are given in table 14.

TABLE 14

Quantities of Suspension Fertilizer Produced

| F in clarified phossy water, % | Solids in clarified phossy water, % | Quantity of water in clarified phossy water, lb/ton phosphorus | Suspension fertilizers made, ton/ton phosphorus |
|---|---|---|---|
| 0.6 | 1.5 | 23,168 | 35.2 |
| 0.7 | 1.7 | 19,851 | 30.1 |
| 0.9 | 2.2 | 15,256 | 23.2 |
| 1.0 | 2.4 | 13,775 | 20.9 |
| 1.5 | 3.6 | 9,073 | 13.8 |
| 2.0 | 4.9 | 6,010 | 9.1 |
| 2.5 | 6.1 | 5,304 | 8.0 |
| 3.0 | 7.3 | 4,365 | 6.6 |
| 4.0 | 9.7 | 3,188 | 4.8 |
| 5.0 | 12.1 | 2,485 | 3.8 |
| 7.0 | 17.0 | 1,674 | 2.5 |
| 10.0 | 24.3 | 1,069 | 1.6 |
| 15.0 | 36.5 | 598 | 0.9 |

EXAMPLE XXV

The quantities of $(NH_4)_2HPO_4$, KF, and $NH_4F$ in clarified phossy water are given in table 12. These three compounds are soluble in water and they can be recovered by using them to make suspension fertilizers. Current values of the three nutrients—N, $P_2O_5$, and $K_2O$—can be obtained from journals which give their value and the value of fluorine present as fluoride.

As described in Example XXIV, one process for making suspension fertilizer is to dissolve APP in water. Table 13 gives the formulation. APP can be dissolved in phossy water thereby recovering $(NH_4)_2HPO_4$, KF, and $NH_4F$ in the fertilizer mixture. Calculations were made to estimate value of phossy water as feedstock for production of suspension fertilizer, and results are given in table 15.

TABLE 15

Estimated Value of Nutrients and Fluorine in Phossy Water

|  | $/ton elemental phosphorus |
|---|---|
| Value of nutrients |  |
| $P_2O_5$ | 5.48 |
| N | 0.48 |
| $K_2O$ | 1.08 |
| Total value of nutrients | 7.04 |
| Value of fluorine |  |
| F | 102.16 |
| Transportation cost | −7.07[a] |
| Net value of nutrients and fluorine | 102.13 |

[a] It was assumed phossy water would be transported from a plant producing elemental phosphorus to a plant producing suspension fertilizer.

Table 15 indicates savings from recovery of phossy water is equivalent to about $102.13 per ton of elemental phosphorus produced. Cost of producing the element can be reduced about 6 percent by recovering phossy water.

EXAMPLE XXVI

Combustible gases may be formed when phosphorus-containing solids are agitated in equipment shown in FIG. 1. Possible ignition of the gas may cause explosions. A laboratory apparatus was designed to subject a phosphorus-containing solid-phosphorus sludge—to different temperatures, pH values, and mixing times. Composition of the gas evolved was determined. One series of experiments was carried out in which phosphorus sludge was stirred in a stainless steel beaker. Another series of experiments was made in which a mild steel liner was placed in the stainless steel beaker.

Analysis of phosphorus sludge used in the two series of experiments was as follows.

|  | pH | Elemental phosphorus, % | Benzene-insoluble, % | Water, % |
|---|---|---|---|---|
| Experiments with unlined stainless steel beaker | 3.7 | 23.5 | 17.0 | 27.4 |
| Experiments with stainless steel beaker lined with mild steel | 3.5 | 18.8 | 12.0 | 45.0 |

Gas evolution rate and gas composition are given in table 16. Phosphorus sludge was stirred to simulate mixing. Data in table 16 show that hydrogen is evolved in phosphorus sludge in sufficient quantity to form a flammable mixture if gas became mixed with air. Hydrogen evolution was greater at low pH and in experiments in which phosphorus sludge was in contact with mild steel. The data show the importance of using non-corrosive materials of construction to fluidize phosphorus-containing solids. However, hydrogen was evolved under conditions wherein corrosion would not be expected to be a factor. Evolution of nitrogen from phosphorus sludge during the experiments was not explained.

TABLE 16
Rate of Evolution of Gas and Gas Composition During Mixing of Phosphorus Sludge

| Temp., °F. | pH[a] | Gas evolution rate, ml/hr | Composition of evolved gases, % by volume | | | | | | N₂ by difference |
|---|---|---|---|---|---|---|---|---|---|
| | | | $CO_2$ | $PH_3$[b] | $O_2$ | $CO$ | $CH_4$ | $H_2$ | |
| *Stainless steel beaker* | | | | | | | | | |
| 150 | 2.0 | 10.0 | 0.6 | 0.1 | 0.4 | 0.0 | 0.6 | 28.4 | 69.9 |
| 180 | 2.0 | 8.5 | 0.6 | 0.4 | 0.1 | 0.0 | 0.3 | 47.9 | 50.7 |
| 150 | 4.0 | 0.3 | 0.0 | 0.2 | 1.1 | 0.0 | 0.0 | 7.2 | 91.5 |
| 180 | 4.0 | 1.8 | | | | | | | |
| 150 | 6.0 | 2.1 | 0.1 | 0.1 | 0.2 | 0.0 | 0.0 | 17.4 | 82.2 |
| 180 | 6.0 | 6.6 | | | | | | | |
| 150 | 7.0 | 1.7 | 0.1 | 0.2 | 0.2 | 0.0 | 0.0 | 9.4 | 89.8 |
| 180 | 7.0 | 7.2 | | | | | | | |
| 150 | 8.0 | 0.6 | 0.1 | 0.1 | 3.6 | 0.0 | 0.1 | 20.8 | 75.3 |
| 180 | 8.0 | 5.8 | | | | | | | |
| 150 | 9.0 | 2.3 | 0.0 | 0.1 | 1.2 | 0.0 | 0.0 | 25.8 | 72.9 |
| 180 | 9.0 | 10.2 | | | | | | | |
| *Stainless steel beaker lined with mild steel* | | | | | | | | | |
| 78–119 | 2.0 | 146.7 | 0.4 | 0.7 | 0.6 | 0.0 | 0.1 | 51.6 | 46.6 |
| 150 | 4.0 | 2.8 | 0.5 | 0.4 | 0.4 | 0.0 | 0.1 | 39.9 | 58.7[c] |
| 180 | 4.0 | 9.8 | | | | | | | |
| 180 | 6.0 | 5.0 | 0.2 | 0.4 | 0.0 | 0.0 | 0.1 | 33.8 | 65.5 |
| 180 | 6.0 | 10.7 | | | | | | | |
| 180 | 7.0 | 6.2 | 0.4 | 0.2 | 2.1 | 0.0 | 0.0 | 9.8 | 87.2 |

[a] A 10% phosphoric acid solution and a 10% ammonium hydroxide solution were used to adjust pH.
[b] Reagent used to absorb phosphine was silver nitrate. This reagent absorbs phosphorus vapor, arsine ($AsH_3$), stibine ($SbH_3$), organic sulfur compounds, as well as phosphine ($PH_3$). Indicated phosphine content of gas may be greater than actual phosphine content.
[c] Residual gas was analyzed by chromatography and it was confirmed gas was nitrogen.

EXAMPLE XXVII

Data in Example XXVI were used to design fluidizer shown in FIG. 1. Tank was kept full of liquid to eliminate space for gases to accumulate. Gases generated during fluidization of phosphorus-containing solids are discharged through standpipe, or gases may be burned along with phosphorus-containing solids.

EXAMPLE XXVIII

A publication entitled "A High Temperature Superphosphoric Acid Plant," *Industrial and Engineering Chemistry*, volume 59, No. 6, June 1967, described a plant which had capacity for burning elemental phosphorus at a rate of 6000 pounds per hour. Elemental phosphorus was burned in two combustion chambers operating in parallel. All metal which was in contact with phosphoric acid was constructed of A.I.S.I. Type 316 stainless steel.

Combustion chambers were cooled by water which circulated through jackets, and heated water was discharged as effluent. When combustion chambers were cooled in this manner, a film of polymerized phosphoric acid condensed on the inside surface of the chambers. Polymerized phosphoric acid was formed by the following equations.

$$P_4 + 5 O_2 = 2P_2O_5.$$

$$2P_2O_5 + 2H_2O = 4HPO_3.$$

Sufficient water was added to combustion chambers in the form of humidity to combine with $P_2O_5$ and make $HPO_3$.

Cooling water was treated with sulfuric acid to adjust pH to the range of 5.6 to 6.0 to prevent scale deposits resulting from hardness of process water. Piping and jackets were made of A.I.S.I. Type 304 stainless steel.

Water cooling was applied to the hydrator, venturi, bottom third of separator tower, ducts connecting vessels, and acid piping from hydrator to product acid cooler. All this equipment was jacketed and heated water was discarded as an effluent.

Phosphoric acid flowed by gravity from hydrator at a rate of 450 to 600 gallons per minute and at a temperature of 200° to 350° F. to a phosphoric acid cooling assembly shown in FIG. 2. Cooler tank was 9 feet in diameter and 11.5 feet high. Cooler tank contained 36 Platecoils having a total area of 1044 square feet. Hot phosphoric acid was cooled by water flowing through Platecoils and by water sprayed onto outside of cooler tank. An agitator with two turbine-type impellers was provided in cooler tank. Cooled phosphoric acid was collected in a receiver tank; it was strained to remove solid polymerized phosphoric acid, and it was then pumped to spray nozzles in the hydrator. Cooled acid was thereby recycled and it served as cooling medium to remove heat from the hydrator.

Dilute phosphoric acid from separator flowed by gravity to a 1800-gallon receiver from which it was pumped to sprays in hydrator, separator tower, and venturi scrubber.

Elemental phosphorus was burned at rates ranging between 3500 and 4300 pounds per hour. Data on heat removal in main components of the plant were obtained when elemental phosphorus was burned at rates ranging from 3500 to 4300 pounds per hour. Table 17 gives quantity of heat removed by cooling water.

TABLE 17

| | Heat Removal at Stainless Steel Phosphoric Acid Plant | | | |
|---|---|---|---|---|
| | Area cooled by water, sq. ft. | Heat removed by cooling water | | |
| Cooling unit | | Btu/hr.[a] | % of input[b] | Btu/hr./ sq. ft. |
| Combustion chambers | 1311 | 26,500,000 | 57.4 | 20,000 |
| Hydrator | 903 | 6,700,000 | 14.7 | 7,400 |
| Acid cooler | 1300 | 9,100,000 | 19.7 | 7,000 |
| Venturi scrubber | 157 | 400,000 | 0.8 | 2,300 |
| Separator tower bottom | 396 | 900,000 | 2.0 | 2,400 |

[a] Heat in gas leaving separator was 2,400,000 Btu per hour and total heat was 43,600,000 Btu per hour.
[b] Heat in gas leaving separator was 5.4 percent of total heat.

EXAMPLE XXIX

Table 17 in Example XXVIII shows energy removed in cooling water at a phosphoric acid production unit was $43.6 \times 10^6$ Btu per hour. Nominal elemental phosphorus burning rate was 3 tons per hour, and energy removal is $14.53 \times 10^6$ Btu per ton of elemental phosphorus burned. The energy was released by combustion of elemental phosphorus and by hydration of $P_2O_5$ to make phosphoric acid.

Boiler feedwater can be used for cooling instead of process water thereby avoiding the discharge of cooling water as effluent. Stream pollution occurs when effluent is discharged. However, use of boiler feedwater instead of process water will eliminate stream pollution, and energy from conversion of elemental phosphorus to thermal phosphoric acid can be recovered as electric energy.

It was assumed that hated boiler feedwater will be used in a boiler to generate steam. The steam can be used to drive a steam turbine which will drive an electric generator. Efficiency data for the combination of boiler—steam turbine—electric generator is reported in Perry's Chemical Engineers Handbook, Sixth Edition, FIG. 9-80C, page 9-73, is as follows.

Boiler 80%
Turbine 75%
Electric generator 95%

Overall effiency for conversion of heated boiler feedwater to electric energy is therefore 57 percent. Since energy removed by water cooling is $14.53 \times 10^6$ Btu per ton of elemental phosphorus, $14.53 \times 10^6 \times 0.57 = 8.265 \times 10^6$ Btu can be recovered as electric energy per ton of elemental phosphorus. The $8.265 \times 10^6$ Btu is equivalent to 2433 kWh of electric energy. About 12,500 kWh of electric energy is required to smelt phosphate ore per ton of elemental phosphorus produced. Therefore, about 19 percent of electric energy for smelting can be recovered if boiler feedwater is used for cooling.

EXAMPLE XXX

Phosphate ore deposits occur in Williamson, Maury, and Giles Counties in Tennessee, and scattered deposits may be found in other counties in the state. Ore is mined at relatively low cost but Tennessee ore is low grade. Heretofore, it has been impractical to smelt Tennessee ore without beneficiation wherein large losses of mineral phosphate occur. And much of the Tennessee ore is unsuited for beneficiation. Washing the ore for upgrading is a potential source of ground water pollution as well as pollution of watercourses.

A process is outlined herewith for upgrading phosphate ore without resorting to pollution-prone beneficiation methods. In order to explain the new method of upgrading, steps in the process are given below.

1. Collect phosphorus-containing solids generated during production of elemental phosphorus.
2. Add sufficient elemental phosphorus to mixture in step 1 to prepare a combustible mixture.
3. Fluidize mixture in step 2 by means of assembly shown in FIG. 1.
4. Make impure phosphoric acid from fluidized mixture in step 3.
5. Prepare monocalcium phosphate binder by reacting finely ground phosphate ore with impure phosphoric acid from step 4 wherein binder is made by process similar to that for making concentrated superphosphate.
6. Agglomerate phosphate ore wherein sufficient binder is used to prepare agglomerates containing a minimum of 24.5 percent $P_2O_5$ when percentage is on the basis of phosphate plus silica.
7. Smelt agglomerated phosphate ore from step 6 to produce elemental phosphorus.

EXAMPLE XXXI

Another process is outlined below for upgrading phosphate ore without resorting to the usual beneficiation methods.

1. Collect phosphorus-containing solids generated during production of elemental phosphorus.
2. Fluidize mixture in step 1 by means of assembly shown in FIG. 1.
3. Make impure phosphoric acid from fluidized mixture in step 2 by burning mixture with heated air wherein sufficient heat is provided to sustain combustion.
4. Add phosphoric acid sludge to mixture prepared in step 3.
5. Prepare monocalcium phosphate binder by reacting finely ground phosphate ore with acid mixture in step 4 wherein binder is made by process similar to that for making concentrated superphosphate.
6. Agglomerate phosphate ore wherein sufficient binder is used to prepare agglomerates containing a minimum of 24.5 percent $P_2O_5$ when percentage is on basis of phosphate plus silica.
7. Smelt agglomerated phosphate ore from step 6 to produce elemental phosphorus.

Low-grade phosphate ore mined in Tennessee generally contains sufficient silica to combine with CaO and $Al_2O_3$ and in most cases silica rock is not required for feedstock. The percentages of binder and phosphate ore required to produce mixtures containing 24.5 percent $P_2O_5$ were calculated for phosphate ores containing 12 to 20 percent $P_2O_5$. For the calculations it was assumed the binder contains 48 percent $P_2O_5$, which is the same as the $P_2O_5$ content of concentrated superphosphate. Results of the calculations are given in table 18.

TABLE 18

Percentages of Binder and Phosphate Ore in Mixtures Containing 24.5 Percent $P_2O_5$

| $P_2O_5$ in phosphate ore, % | Binder in agglomerates, % | Phosphate ore in agglomerates, % |
|---|---|---|
| 20 | 16 | 84 |
| 18 | 22 | 78 |
| 16 | 27 | 73 |
| 14 | 31 | 69 |
| 12 | 35 | 65 |

EXAMPLE XXXII

Elemental phosphorus was produced at the TVA National Fertilizer Development Center (NFDC) for the period 1934 to 1976. More than 17,000 tons of precipitator dust accumulated as a phosphorus-containing solid. Although precipitator dust contains elemental phosphorus, the elemental phosphorus content is not high enough for economic recovery. Nevertheless, precipitator dust is a hazardous waste and it remains in storage because low-cost treating methods were not available.

Precipitator dust contains about 28 percent $P_2O_5$ on phosphate-plus-silica basis, and in its agglomerated form the waste is expected to be a suitable feedstock for smelting in an electric furnace. A series of tests is proposed whereby precipitator dust stored at NFDC would be used to determine the effect of recycling phosphorus-containing solids on the operation of phosphorus furnaces, thus consuming material stored at NFDC.

Having thus described the invention, what is claimed is:

1. A process for production of elemental phosphorus, said process comprised of the following steps:

(a) agglomerating phosphate ore by tumbling with binder formed by reacting acidic phosphorus compounds with alkaline substances;
(b) smelting agglomerated phosphate ore in step (a) with reducing carbon and silica in a submerged-arc electric furnace to generate a mixture of gases, said gas mixture containing carbon monoxide, hydrogen, and elemental phosphorus;
(c) cooling gases in step (b) by contacting said gases with water;
(d) collecting mixture of elemental phosphorus, phosphorus-containing solids, and water from step (c) in a sump;
(e) recycling water from step (d) to step (c);
(f) bleeding off a stream of water from step (e);
(g) removing phosphorus-containing solids from stream of water bled off in step (f);
(h) pumping mixture of elemental phosphorus and phosphorus-containing solids from said sump in step (d) to a tank having submerged pump in a well;
(i) pumping bottom layer to product storage;
(j) pumping phosphorus-containing solids from step (g) and step (i) to fluidizer;
(k) fluidizing mixture of phosphorus-containing solids in step (j);
(l) feeding fluidized mixture from step (k) to a burner;
(m) oxidizing mixture from step (l) to form phosphorus oxides;
(n) reacting phosphorus oxides in step (m) with water to form acidic phosphorus compounds; and
(o) pumping acidic phosphorus compounds in step (n) to step (a).

2. Process of claim 1 wherein $P_2O_5$:CaO mole ratio in binder in step (a) is in the range of 0.93 to 0.95.

3. Process of claim 1 wherein reducing carbon in step (b) is agglomerated by tumbling with binder formed by reacting acidic phosphorus compounds with alkaline substances.

4. Process of claim 1 wherein mixture of gases in step (b) is cleaned by treating said gases in an electrostatic precipitator to remove phosphorus-containing solids and said solids are added to fluidizer in step (k).

5. Process of claim 1 wherein elemental phosphorus is added to fluidizer in step (k).

6. Process of claim 1 wherein dispersant is added to fluidizer in step (k).

7. Process of claim 1 wherein mixture in step (m) is oxidized with heated air.

8. Process of claim 1 wherein phosphoric acid sludge is added to acidic phosphorus compounds in step (o).

9. Process for production of solution containing ammonium fluoride, potassium fluoride, and ammonium phosphate, said process comprised of the following steps:

(a) agglomerating phosphate ore by tumbling with binder formed by reacting phosphoric acid with phosphate ore;
(b) drying agglomerated phosphate ore formed in step (a);
(c) smelting agglomerated phosphate ore in step (b) with reducing carbon and silica in a submerged-arc electric furnace to generate mixture of gases, said mixture containing carbon monoxide, hydrogen, and elemental phosphorus;
(d) cleaning gases generated in step (c) by treating said gases with an electrostatic precipitator;
(e) cooling gases generated in step (c) by contacting said gases with water;

(f) collecting mixture of elemental phosphorus, phosphorus-containing solids, and water from step (e) in a sump;
(g) recycling water from step (f) to step (e);
(h) bleeding off a stream of water from step (g);
(i) removing phosphorus-containing solids from stream of water bled off in step (h);
(j) recycling water from step (i) to step (f);
(k) bleeding off stream of recycled water in step (j);
(l) slurrying precipitator dust collected in step (d) with stream of recycled water in step (j);
(m) separating liquid nd solid phases in step (l);
(n) recycling liquid phase in step (m) to sump in step (f);
(o) ammoniating stream of recycled water in step (j) to prepare scrubbing medium;
(p) scrubbing gases discharging in step (a) and step (b) with scrubbing medium prepared in step (o);
(q) separating liquid and solid phases in scrubbing medium in step (p);
(r) adding phosphoric acid to liquid phase in step (q) to prepare scrubbing medium;
(s) scrubbing gases discharging in step (a) and step (b) with scrubbing medium prepared in step (r); and
(t) collecting scrubbing medium from step (s) containing ammonium fluoride, potassium fluoride, and ammonium phosphate.

10. Process of claim 9 wherein agglomerated phosphate ore is dried in step (b) in temperature range 392° to 572° F.

11. Process of claim 9 wherein liquid and solid phases are separated in step (m) by clarification.

12. Process of claim 9 wherein pH of scrubbing medium in step (o) is about 8.5.

13. Process of claim 9 wherein pH of scrubbing medium in step (o) is about 9.0.

14. Process of claim 9 wherein scrubber in step (p) is a spray chamber.

15. Process of claim 9 wherein phosphoric acid in step (r) is phosphoric acid sludge.

16. Process of claim 7 wherein liquid and solid phases in step (q) are separated by clarification.

17. Process of claim 9 wherein solid phase separated in step (q) is recycled to step (a).

18. Process of claim 9 wherein phosphoric acid in step (r) contains about 76 percent $P_2O_5$.

19. Process of claim 9 wherein scrubber in step (s) is a packed tower.

20. Process of claim 9 wherein fluorine content of scrubbing medium in step (t) is about 5 percent, expressed as F.

21. Process of claim 9 wherein quantities of salts in step (t) are about 264 pounds ammonium fluoride per ton of elemental phosphorus produced, about 18 pounds of potassium fluoride per ton of elemental phosphorus produced, and about 62 pounds ammonium phosphate per ton elemental phosphorus produced.

22. A process for upgrading phosphorus furnace feedstock, said process comprised of the following steps:
(a) mining phosphate ore;
(b) drying phosphate ore obtained in step (a);
(c) reacting acidic phosphorus compounds with alkaline substances to obtain a reaction product;
(d) drying reaction product prepared in step (c);
(e) mixing dried reaction product prepared in step (d) with phosphorus furnace feedstock; and
(f) smelting mixture prepared in step (e) in submerged arc electric furnace.

23. Process of claim 22 wherein phosphate ore in step (a) contains 12.0 to 24.5 percent $P_2O_5$ on a dry basis.

24. Process of claim 22 wherein phosphate ore in step (a) contains 12.0 to 20.0 percent $P_2O_5$ on a dry basis.

25. Process of claim 22 wherein phosphate ore in step (b) is dried to a moisture content of about 10 percent.

26. Process of claim 22 wherein acid phosphorus compounds in step (c) are taken from the group, wet-process phosphoric acid, thermal phosphoric acid, phosphoric acid sludge, and spent phosphoric acid.

27. Process of claim 22 wherein alkaline substance in step (c) is taken from the group, ammonia, ammonium hydroxide, calcium oxide, calcium hydroxide, calcium carbonate, and phosphate ore.

28. Process for preparing feedstock for smelting phosphate ores, said process comprised of the following steps:
(a) mining phosphate ore;
(b) drying phosphate ore in step (a);
(c) mixing precipitator dust containing about 28 percent $P_2O_5$ and having a $SiO_2:CaO$ weight ratio of about 1.2 with phosphate or in step (b);
(d) reacting acidic phosphorus compounds with alkaline substances forming a binder for agglomeration;
(e) tumbling binder formed in step (d) with mixture of precipitator dust and phosphate ore prepared in step (c) forming agglomerates;
(f) drying agglomerates formed in step (e); and
(g) smelting agglomerates prepared in step (f).

29. Process of claim 28 wherein phosphate ore in step (b) is dried to a moisture content of about 10 percent.

30. Process of claim 28 wherein acidic phosphorus compounds in step (d) are taken from the group, thermal phosphoric acid, phosphorus acids prepared from phosphorus-containing solids, merchant-grade wet-process phosphoric acid, phosphoric acid sludge, and spent phosphoric acid.

31. Process of claim 28 wherein alkaline substance in step (d) is phosphate ore.

32. Process of claim 28 wherein drying temperature in step (f) is in the range 250° to 1200° F.

33. Process for generation of electric energy, said process comprised of the following steps:
(a) agglomerating phosphate ore by tumbling with a binder formed by reacting acidic phosphorus compounds with alkaline substances;
(b) smelting agglomerated phosphate ore in step (a) with reducing carbon and silica in a submerged-arc electric furnace to generate a mxiture of gases, said mixture containing carbon monoxide, hydrogen, and elemental phosphorus;
(c) cooling gases in step (b) by contacting said gases with water;
(d) collecting mixture of elemental phosphorus, phosphorus-containing solids, and water from step (c) in a sump;
(e) recycling water from step (d) to step (c);
(f) bleeding off a stream of water from step (e);
(g) removing phosphorus-containing solids from stream of water bled off in step (f);
(h) pumping mixture of elemental phosphorus and phosphorus-containing solids from said sump in step (d) to a tank having submerged pump in a well;
(i) pumping bottom layer to storage;
(j) pumping phosphorus-containing solids from step (g) and step (i) to fluidizer;
(k) fluidizing mixture of phosphorus-containing solids in step (j);

(l) feeding fluidized mixture from step (k) to phosphoric acid production unit;
(m) cooling phosphoric acid made in step (l) with boiler feedwater;
(n) recycling phosphoric acid in step (m) to phosphoric acid production unit;
(o) pumping phosphoric acid in step (m) to step (a);
(p) feeding elemental phosphorus from step (i) to phosphoric acid production unit;
(q) cooling combustion chamber, hydrator, phosphoric acid, and separator tower bottom with boiler feedwater;
(r) recycling cooled phosphoric acid to phosphoric acid production unit;
(s) feeding boiler feedwater from step (m) and step (q) to boiler;
(t) cleaning gases in step (c);
(u) burning gases from step (t) in boiler in step (s); and
(v) generating electric energy from steam obtained in step (u).

34. Process of claim 33 wherein gases in step (t) are burned in a combined cycle electric energy generating facility.

* * * * *